US 6,449,660 B1

(12) United States Patent
Berg et al.

(10) Patent No.: US 6,449,660 B1
(45) Date of Patent: Sep. 10, 2002

(54) OBJECT-ORIENTED I/O DEVICE INTERFACE FRAMEWORK MECHANISM

(75) Inventors: William Frederick Berg; John David Dietel, both of Rochester, MN (US); Edward John Rowlance, New Philadelphia, OH (US)

(73) Assignee: International Business Machines Corporation, Armonk, NY (US)

( * ) Notice: Subject to any disclaimer, the term of this patent is extended or adjusted under 35 U.S.C. 154(b) by 1261 days.

(21) Appl. No.: 08/509,619

(22) Filed: Jul. 31, 1995

(51) Int. Cl.[7] .................................................. G06F 3/00
(52) U.S. Cl. ............................ 710/1; 709/321; 717/100
(58) Field of Search ................................. 395/681, 683, 395/680; 710/1; 717/100; 709/321

(56) References Cited

U.S. PATENT DOCUMENTS

| | | | |
|---|---|---|---|
| 4,943,932 A | 7/1990 | Lark et al. ................... | 364/513 |
| 5,057,996 A | 10/1991 | Cutler et al. ................. | 364/200 |
| 5,101,364 A | 3/1992 | Davenport et al. .......... | 395/152 |
| 5,119,475 A | 6/1992 | Smith et al. ................. | 395/156 |
| 5,181,162 A | 1/1993 | Smith et al. ................. | 364/419 |
| 5,195,172 A | 3/1993 | Elad et al. ..................... | 395/50 |
| 5,226,161 A | 7/1993 | Khoyi et al. ................. | 395/650 |
| 5,247,693 A | 9/1993 | Bristol ......................... | 395/800 |
| 5,249,270 A | 9/1993 | Stewart et al. ............... | 395/200 |
| 5,257,384 A | 10/1993 | Farrand et al. .............. | 395/725 |
| 5,261,080 A | 11/1993 | Khoyi et al. ................. | 395/500 |
| 5,274,572 A | 12/1993 | O'Neill et al. ............... | 364/550 |
| 5,276,775 A | 1/1994 | Meng ........................... | 395/55 |
| 5,287,447 A | 2/1994 | Miller et al. ................. | 395/157 |
| 5,293,470 A | 3/1994 | Birch et al. .................. | 395/135 |
| 5,297,283 A | 3/1994 | Kelly, Jr. et al. ............ | 395/650 |
| 5,301,323 A * | 4/1994 | Maeurer et al. ............. | 709/105 |
| 5,315,703 A | 5/1994 | Matheny et al. ............. | 395/164 |
| 5,367,633 A | 11/1994 | Matheny et al. ............. | 395/164 |
| 5,369,766 A | 11/1994 | Nakano et al. .............. | 395/700 |
| 5,379,430 A | 1/1995 | Nguyen ....................... | 395/700 |
| 5,379,431 A * | 1/1995 | Lemon et al. ................ | 710/10 |
| 5,388,264 A | 2/1995 | Tobias, II et al. ........... | 395/650 |
| 5,390,325 A | 2/1995 | Miller ......................... | 395/575 |
| 5,396,626 A | 3/1995 | Nguyen ....................... | 395/700 |
| 5,398,336 A | 3/1995 | Tantry et al. ................ | 395/600 |
| 5,495,610 A * | 2/1996 | Shing et al. ................. | 709/221 |
| 5,544,302 A * | 8/1996 | Nguyen ....................... | 345/837 |
| 5,557,796 A * | 9/1996 | Fehskens et al. ............ | 712/220 |

OTHER PUBLICATIONS

F. Metthijs, Y. Berbers, P. Verbaeten, "A Flexible I/O Framework for Parallel and Distributed Systesm", IEEE, pp. 187–190, 1995.*

Text of IBM Technical Disclosure Bulletin, vol. 37, DeBinder et al., Feb. 1994, "Results Folder Framework", pp. 431–432.

Text of IBM Technical Disclosure Bulletin, vol. 36, Coskun, N., Jun. 1993, "Persistent Framework Independent Record/Playback Framework", pp. 261–264.

(List continued on next page.)

Primary Examiner—St. John Courtenay, III
(74) Attorney, Agent, or Firm—Steven W. Roth

(57) ABSTRACT

At the most general level, the I/O framework mechanism of the present invention is made up of three interdependent controllers. These controllers are referred to herein as the hardware resource administrator, the information controller, and the device controller. The hardware resource administrator is responsible for organizing information about I/O devices and for making the organized information available to the other controllers. The information controller is responsible for gathering information about I/O devices and for changing and/or updating certain I/O device information. Accordingly, the information controller is made up of individual objects that each represent the characteristics of a particular I/O device. The device controller is responsible for controlling the actual operation of the individual devices, and for performing statistical and diagnostic analysis on the individual I/O devices.

30 Claims, 26 Drawing Sheets

OTHER PUBLICATIONS

Text of IBM Technical Disclosure Bulletin, Baker et al., Oct. 1991, "Model View Schema", pp. 321–322.

Text of IBM Technical Disclosure Bulletin, Baker et al., Oct. 1991, "Office Container Class", pp. 309–310.

Text of IBM Technical Disclosure Bulletin, Cavendish et al., Jul. 1991, "Icon Pane Class", pp. 118–119.

Text of IBM Technical Disclosure Bulletin, Baker et al., Jun. 1991, "Distribution List Class", p. 159.

Text of IBM Technical Disclosure Bulletin, Cavendish et al., Jun. 1991, "Object–Oriented Documentation Tool", pp. 50–51.

Text of IBM Technical Disclosure Bulletin, Allard et al., Feb. 1990, "Object–Oriented Programming in C—the Linnacus System", pp. 437–439.

Text of IBM Technical Disclosure Bulletin, vol. 38, No. 1, Jan. 1995, pp. 411–414, J. Knapman, "Generating Specific Server Programs in Distributed Object–Oriented Customer Information Control System".

Text of IBM Technical Disclosure Bulletin, vol. 37, No. 12, Dec. 1994, pp. 19–20, Al–Karmi et al., "Events Set for Event Tracing in Distributed Object–Oriented Systems".

Text of IBM Technical Disclosure Bulletin, vol. 37, No. 12, Dec. 1994, pp. 375–378, Acker et al., "Automatically Generating Formatted Documentation for Object–Oriented Class Libraries".

Text of IBM Technical Disclosure Bulletin, vol. 37, No. II, Nov. 1994, pp. 71–72, Behrs et al., "Device Support Framework to Support ISO DPA 10175 and POSIX 1387.4".

Text of IBM Technical Disclosure Bulletin, vol. 37, No. 7, Jul. 1994, pp. 145–146, Banda et al., "Exception Management Algorithm for Multi–Threaded Method Invocation".

Text of IBM Technical Disclosure Bulletin, vol. 37, No. 6B, Jun. 1994, pp. 553–556, Gest et al., "Portable Object–Oriented Event Manager".

Abstract for WIPO Patent Application No. WO 95/04966, F. T. Nguyen, Feb. 16, 1995, "Automatic Management of Components in Object–Oriented System".

Abstract for U.S. Patent No. 5,388,264, Milne et al., Feb. 7, 1995, "Object–Oriented Framework System for Enabling Multimedia Presentation with Routing and Editing of MIDI Information".

Abstract for WIPO Patent Application No. WO 94/23364, Heninger et al., Oct. 13, 1994, "Framework Processing Apparatus for Application Software".

Abstract for U.S. Patent No. 5,369,766, Heninger et al., Nov. 29, 1994, "Object Oriented Application Processing Apparatus".

Abstract from WIPO Patent Application No. WO 9422081, Sep. 29, 1994, "Hardware–Independent Interface for Interrupt Processing", G. O. Norman et al.

Abstract for WIPO Patent Application No. 94/19752, Anderson et al., Sep. 1, 1994, "Concurrent Framework Processing Apparatus for Two or More Users".

Abstract for WIPO Patent Application No. 94/19751, Anderson et al., Sep. 1, 1994, "Concurrent Framework Processing Apparatus for Application Users".

Abstract for WIPO Patent Application No. 94/19740, Goldsmith et al., Sep. 1, 1994, "Framework Processor of Object–Oriented Application".

Abstract for WIPO Patent Application No. 94/15286, Goldsmith et al., Jul. 7, 1994, "Object–Oriented Framework for Object Operating System".

Abstract for WIPO Patent Application No. 94/15282, Anderson et al., Jul. 7, 1994, "Dialog System Object–Oriented System Software Platform".

Abstract for WIPO Patent Application No. 94/15281, Anderson et al., Jul. 7, 1994, "Atomic Command Object–Oriented System Software Platform".

Abstract from WIPO Patent Application No. WO 9415285, Jul. 7, 1994, "Object–Oriented Notification Framework System", D. R. Anderson et al.

Abstract for U.S. Patent No. 5,119,475, Schoen et al., Jun. 2, 1992, "Object–Oriented Framework for Menu Definition".

Abstract No. 95–091003/12, "Flexible Multi–Platform Partitioning for Computer Applications in Object Oriented System".

Abstract for WIPO Patent Application No. 95/01610, Koko et al., Jan. 12, 1995, "Object Oriented Product Structure Management in Computer–Aided Product Design".

Abstract fpr WIPO Patent Application No. 95/04967, Feb. 16, 1995, "Access Method to Data Held in Primary Memory Based Data Base".

Abstract for WIPO Patent Application No. 95/02219, Helgeson et al., Jan. 19, 1995, "Distributed Computation Based on Movement, Execution and Insertion of Processes in Network".

Abstract from U.S. Patent No. 5,371,891, "Object Constructions in Compiler in Object Oriented Programming Language", J. Gray et al., Dec. 6, 1994.

Abstract from EPO Patent Application No. EP 622730, "Encapsulation of Extracted Portions of Documents Into Objects", M. A. Malamud, Nov. 2, 1994.

Abstract for EPO Patent No. 619544, S. Danforth, Oct. 12, 1994, "Language–Neutral Object–Oriented Programming".

Abstract for WIPO Patent No. 94/20912, Sep. 15, 1994, "Object–Oriented System for Managing Financial Instruments".

Inspec Abstract No. C9504–7460–043, Sells et al., 1995, "Implementation of the Architecture for a Time–Domain Dynamical System Simulation in a Very High–Level Pictorial Object–Oriented".

Inspec Abstract No. C9504–7460–042, Coleman et al., 1995, "An End–to–End Simulation of A Surveillance System Employing Architecture Independence, Variable Fidelity Components and Software Reuse".

Inspec Abstract No. C9503–6140D–045, Satoh et al., 1995, "Process Algebra Semantics for a Real Time Object Oriented Programming Language".

Inspec Abstract No. C9501–7160–020, C. Le Pape, 1993, "The Cost of Genericity: Experiments With Constraint–Based Representations of Time–Tables".

Inspec Abstract No. C9501–6140D–005, S. Vinoski, 1994, "Mapping CORBA IDL Into C++".

Inspec Abstract No. C9501–7330–007, Salminen et al., 1994, "Modelling Trees Using an Object–Oriented Scheme".

Inspec Abstract No. C9412–6110B–221, Berghel et al., 1992, "A Generic Object–Oriented Concurrency Mechanism for Extensibility and Reuse of Synchronization Components".

Inspec Abstract No. B9412–6210Q–016, from Oingzhong et al., 1992, "An Object–Oriented Model for Ingelligent Networks".

Inspec Abstract No. C9412–7810–003, from Jung et al., 1993, "Development of an Object–Oriented Anthropometric Database for an Ergonomic Man Model".

Inspec Abstract No. C9412–6110J–014 from Griss et al., 1994, "Object–Oriented Reuse".

Inspec Abstract No. C9411–6130B–108, from Mili et al., 1992, "Building a Graphical Interface for a Reuse–Oriented Case Tool".

Inspec Abstract No. C9411–7100–029, from C. Le Pape, 1994, "Implementation of Resource Constraints in ILOG Schedule: A Library for the Development of Constraint–Based Scheduling Systems".

Inspec Abstract No. C9411–6115–035, from Mili et al., 1991, "SoftClass: An Object–Oriented Tool for Software–Reuse".

Inspec Abstract No. C9410–6180G–015, from Eichelberg et al., 1993, "Integrating Interactive 3D–Graphics into an Object–Oriented Application Framework".

Inspec Abstract No. B9409–6210M–025, from Hellemans et al., 1994, "An Object–Oriented Approach to Dynamic Service Descriptions".

Inspec Abstract No. C9409–6180–059, from Wang et al., 1993, "A Framework for User Customization".

Inspec Abstract No. C9408–6110B–016, from Chen et al., 1994, "An Experimental Study of Using Reusable Software Design Frameworks to Achieve Software Reuse".

Inspec Abstract No. C9408–7420–021, from Pirklbauer et al., 1994, "Object–Oriented Process Control Software".

Inspec Abstract No. C9408–6110J–011, from Gyu–Chung et al., 1993, "System Methodologies of Object–Oriented Programs".

Inspec Abstract No. C9407–7420D–045, from Desai et al., "Controller Structure Definition Via Intelligent Process Control".

Inspec Abstract No. C9407–6140D–014, from Satoh et al., 1994, Semantics for a Real–Time Object–Oriented Programming Language.

Inspec Abstract No. C9406–6150N–015, from Schmidt et al., 1994, "The Service Configurator Framework: An Extensible Architecture for Dynamically Configuring Concurrent, Multi–Service Network Daemons".

Inspec Abstract No. C9405–6180G–031, from Woyak et al., 1993, "A Motif–Like Object–Oriented Interface Framework Using PHIGS".

Inspec Abstract No. C9403–6180–027, 1991, "An Event–Object Recovery Model for Object–Oriented User Interfaces" from Proceedings of ACMSymposium on User Interface Software & Technology.

Inspec Abstract No. C9504–6130B–049, from A. van Dam, 1995, "VR as a Forcing Function: Software Implications of a New Paradigm".

Inspec Abstract No. C9504–6140D–024, from Sheffler et al., 1995, "An Object–Oriented Approach to Nested Data Parallelism".

Inspec Abstract No. C9503–6110B–045, from Rosiene et al., 1995, "A Data Modeling Framework for Queueing Network Models".

Inspec Abstract No. B9503–8110B–023, from Mautref et al., 1995, "An Object–Oriented Framework for the Development of Interactive Decision Support Systems".

Inspec Abstract No. C9502–7160–026, from Menga et al., 1995, "An Object–Oriented Framework for Enterprise Modelling".

Inspec Abstract No. C9502–6130G–006, "Support for Enterprise Modelling in CSCW", P. Hennessy et al., 1994.

Inspec Abstract No. C9502–7810C–058, from Lin et al., 1995, "Can CAL Software Be More Like Computer Games?".

Inspec Abstract No. C9501–6115–039, from Elia et al., 1993, "G++: An Object Oriented Environment for Developing Distributed Applications".

Inspec Abstract No. C9412–7330–186, from Righter et al., 1994, "An Object–Oriented Characterization of Spatial Ecosystem Information".

Inspec Abstract No. C9412–6160J–025 from J. Livari, 1994, "Object–Oriented Information Systems Analysis: A Comparison of Six Object–Oriented Analysis Methods".

Inspec Abstract No. C9412–6110J–006, from Lau et al., 1993, "Using SOM for Tool Integration".

Inspec Abstract No. C9411–6160J–011, from Odberg et al., 1992, "A Framework for Managing Schema Versioning in Object–Oriented Databases".

Inspec Abstract No. C9406–7490–012, "A Discrete–Event Object–Oriented Modeling Environment for Sawmill Simulation".

Inspec Abstract No. C9406–6115–048, 1993, "Constructing Multi–View Editing Environments Using MViews".

Inspec Abstract No. 4664213, "Maintaining Information about Persistent Replicated Objects in a Distributed System", 1993 IEEE Conference on Distributed Computing Systems.

Inspec Abstract No. C9406–6110J–029, "A Comparison of Object–Oriented Analysis and Design Methods", Proceedings of C++ World 1993.

Inspec Abstract No. C9406–0310F–011, 1993, "Cost–Benefit Analysis of Object–Oriented Technology".

Inspec Abstract No. C9406–6110J–007, from J. D. Grimes, 1993, "Objects 101–An Implementation View", Proceedings of COMPCON 1994.

Inspec Abstract No. 4647921, from Uhorchak et al., 1993, "An Object–Oriented Class Library for Creating Engineering Graphs Using PHIGS".

Inspec Abstract No. 4642214, from Marshall et al., 1992, "Using VDM Within an Object–Oriented Framework".

Inspec Abstract No. 4626386, from Arora et al., 1993, "Building Diverse Environments with PCTE Workbench".

Inspec Abstract No. 4622794, from Campbell et al., 1993, "A Technique for Documenting the Framework of an Object–Oriented System".

Inspec Abstract No. 4618974, from Bowers, 1993, "Some Principles for the Encapsulation of the Bahaviour of Aggregate Objects".

Inspec Abstract No. 461931, from Islan et al, 1993, "Uniform Co–Scheduling Using Object–Oriented Design Techniques".

Inspec Abstract No. 4613481, from Thieme et al., 1993, "Schema Integration in Object–Oriented Databases".

Inspec Abstract No. 4603430, from G. Booch, 1994, "Designing an Application Framework".

Inspec Abstract No. 4596323, from Frank et al., 1993, "An Integrated Environment for Designing Object–Oriented Enterprise Models".

Inspec Abstract No. 4593721, Periyasamy et al., 1993, "A Formal Framework for Design and Verification of Robotic Agents".

Inspec Abstract No. 4588839, from L. Fisher, 1992, "Constructing a Class Library for Microsoft Windows".

Inspec Abstract No. 4588834, from G. Olander, 1992, "Chembench: Redesign of a Large Commercial Application Using Object–Oriented Techniques".

Inspec Abstract No. 4566447, from J. Rossazza, 1992, "An Object–Centered Fuzzy Representation".

Inspec Abstract No. 4565630, from Karpovich et al, 1993, "A Parallel Object–Oriented Framework for Stencil Algorithms".

Inspec Abstract No. C9402–6150G–002, from Bruegge et al., 1993, "A Framework for Dynamic Program Analyzers".

Inspec Abstract No. 4550414, from Parrish et al., 1993, "Automated Flow Graph–Based Testing of Object–Oriented Software Modules".

Inspec Abstract No. 4540729, from Bailes et al., "The Ecology of Class Refinement".

Inspec Abstract No. 4534334, from Campbell et al., 1991, "A Technique for Documenting the Framework of an Object–Oriented System".

Inspec Abstract No. 4534330, from Istavrinos et al., 1992, "Experiences with an Object–Oriented Mapper for Coherent Distributed Shared Memory".

Inspec Abstract No. 4528985, from Beneventano et al, 1993, "Taxonomic Reasoning with Cycles in LOGIDATA+".

Inspec Abstract No. 4525743, from Hakimzadeh et al., 1993, "Instance Variable Access Locking for Object–Oriented Databases".

Inspec Abstract No. 4512593, from H. Sakai, 1993, "A Method for Contract Design and Delegation in Object Behavior Modeling".

Inspec Abstract No. B9310–6210L–099, "Templates, Types and Classes in Open Distributed Processing", 1993.

Inspec Abstract No. 4459325, from Kesim et al., 1992, "On the Evolution of Objects in a Logic Programming Framework".

Inspec Abstract No. 4447153, from Klein et al., 1992, "An Object–Oriented Framework for Curves and Surfaces".

Inspec Abstract No. 4426852, from Benveniste et al., 1992, "Concurrent Programming Notations in the Object–Oriented Language Arche".

Inspec Abstract No. 4425343, from Demurjian et al., 1993, "Programming Versus Databases in Object–Oriented Paradigm".

Inspec Abstract No. 4417604, from Kraiem et al, 1992, "Mapping of Conceptual Specifications Into Object–Oriented Programs".

Inspec Abstract No. 4417563, from E. Maim, 1992, "Recognizing Objects from Constraints".

Inspec Abstract No. 4411998, from Yi Deng et al., 1992, "Unifying Multi–Paradigms in Software System Design".

Inspec Abstract No. 4408394, from Allen et al., 1992, "GEM: Global Event Management in CAD Frameworks".

Inspec Abstract No. 4400350, from Y. Shoham, 1993, "Agent–Oriented Programming".

Inspec Abstract No. 4395549, from Hogstrom et al., 1992, "Portability and Data Structures in Scientific Computing–Object–Oriented Design of Utility Routines in Fortran".

Inspec Abstract No. 4391388, from Thomas et al., 1992, "A Generic Object–Oriented Concurrency Mechanism for Extensibility and Reuse of Synchronization Components".

Inspec Abstract No. 4387201, from Chu et al., 1992, "A Pattern Based Approach of Integrating Data and Knowledge to Support Cooperative Query Answering".

Inspec Abstract No. 4366189, from Holt et al., 1992, "A Framework for Using Formal Methods in Object–Oriented Software Development".

Inspec Abstract No. 4356300, from Bertino et al., 1993, "Path–Index: An Approach to the Efficient Execution of Object–Oriented Queries".

Inspec Abstract No. 4341376, from Bertino et al., 1992, "Optimization of Object–Oriented Queries Using Path Indices".

Inspec Abstract No. 4331060, from Lau et al., 1992, "An Object–Oriented Class Library for Scalable Parallel Heuristic Search".

Inspec Abstract No. 4318465, from P. Madany, 1992, "Object–Oriented Framework for File Systems".

Inspec Abstract No. 4302722, from Eggenschwiler et al., 1992, "ET++SwapsManager: Using Object Technology in the Financial Engineering Domain".

Inspec Abstract No. 4298324, from S. Nichol, 1992, "Extending Turbo Vision".

Inspec Abstract No. 4297404, from Tanaka et al., 1992, "Two–Level Schemata and Generalized Links for Hypertext Database Models".

Inspec Abstract No. 4287814, from Natarajan et al., 1992, "Issues in Building Dynamic Real–Time Systems".

Inspec Abstract No. 4281362, from Marshall et al., 1991, "Using VDM within an Object–Oriented Framework".

Inspec Abstract No. 4275707, from Tsukamoto et al., 1991, "DOT: A Term Representation Using DOT Algebra for Knowledge–Bases".

Inspec Abstract No. 4275698, from Van den Bussche et al., 1991, "Evaluation and Optimization of Complex Object Selections".

Inspec Abstract No. 4275693, from Giannotti et al., 1991, "Non–Determinism in Deductive Databases".

Inspec Abstract No. 4270361, from Artale et al., 1991, "Introducing Knowledge Representation Techniques in Database Models".

Inspec Abstract No. 4270125, from Becker et al., 1991, "Reusable Object–Oriented Specifications for Decision Support Systems".

Inspec Abstract No. 4258492, from M. Ball, 1992, "Inside Templates: Implementing C++ Strategies".

Inspec Abstract No. 4258051, from Rundensteiner et al., 1992, "Set Operations in Object–Based Data Models".

Inspec Abstract No. 4244023, from George et al., 1991, "An Object–Oriented Data Model to Represent Uncertainty in Coupled Artificial Intelligence–Database Systems".

Inspec Abstract No. 4234438, from Madany et al., 1991, "Organizing and Typing Persistent Objects Within an Object–Oriented Framework".

Inspec Abastract No. 4152687, from M. Wolczko, 1992, "Encapsulation, Delegation and Inheritance in Object–Oriented Languages".

Inspec Abstract No. 4117514, from Wuwongse et al., 1991, "An Object–Oriented Approach to Model Management".

Inspec Abstract No. C94204–6110J–017, "Choices, Frameworks and Refinement", R. H. Campbell et al., 1991.

Inspec Abstract No. 4090970, from P. Kougiouris, 1991, "Device Management Framework for an Object–Oriented Operating System".

Inspec Abstract No. 4077440, from A. Mahler, 1991, "Organizing Tools in a Uniform Environment Framework".

Inspec Abstract No. 4067033, from Shaw et al., 1990, "Experience with the ET++ Application Framework".

Inspec Abstract No. 4060084, from Muller et al., 1990, "ODICE: Object–Oriented Hardware Description in CAD Environment".

Inspec Abstract No. 4050569, from Di Giovanni et al., 1990, "HOOD Nets".

Inspec Abstract No. C91072815, from Holtkamp et al, 1990, "DEMOM–A Description Based Media Object Data Model".

Inspec Abstract No. C91072016, from A. Lane, 1991, "/DOS/C++–Application Frameworks".

Inspec Abstract No. C91072574, from Hemery et al., "An Analysis of Communication and Multiprogramming in the Helios Operating System".

Inspec Abstract No. C91064787, from Madany et al, 1989, "A Class Hierarchy for Building Stream–Oriented File Systems".

Inspec Abstract No. C91064580, from Gamma et al., 1989, "Integration of a Programming Environment into ET++–A Case Study".

Inspec Abstract No. C91058815, from Menga et al., 1990, "G++: An Environment for Object Oriented Analysis and Prototyping".

Inspec Abstract No. B91052096, from Cusack et al., 1990, "Object–Oriented Specification in LOTOS and Z, or My Cat Really is Object–Oriented!".

Inspec Abstract No. C91053475, from Queinnec et al., 1988, "An Open Ended Data Representation Model for EU–LISP".

Inspec Abstract No. C91053151, from E. Cusack, 1991, "Refinement, Conformance and Inheritance".

Inspec Abstract No. C91042802, from T. Yokoyama, 1990, "An Object–Oriented and Constraint–Based Knowledge Representation System for Design Object Modeling".

Inspec Abstract No. C91041980, from Choi et al., 1991, "Graph Interpretation of Methods: A Unifying Framework for Polymorphism in Object–Oriented Programming".

Inspec Abstract No. C91042655, from Q. Li, 1991, "Extending Semantic Object Model: Towards More Unified View of Information Objects".

Inspec Abstract No. C91024852, from Pierra et al., 1990, "An Object Oriented Approach to Ensure Portability of CAD Standard Parts Libraries".

Inspec Abstract No. C91010951, from T. Helton, 1990, "Level5 Object".

Inspec Abstract No. B90075006, from Gossain et al., 1989, "Designing a Class Hierarchy for Domain Representation and Reusability".

Inspec Abstract No. C91003997, from J. Muys–Vasovic, 1989, "MacApp: An Object–Oriented Application Framework".

Inspec Abstract No. C91004708, from Bertino et al., 1990, "Optimization of Queries Using Nested Indices".

Inspec Abstract No. C90052277, from I. Tervonen, 1990, "Object–Oriented Development as a Multiview Software Construction Methodology".

Inspec Abstract No. C90052627, from Schrefl et al., 1988, "A Knowledge–Based Approach to Overcome Structural Differences in Object Oriented Database Integration".

Inspec Abstract No. C90047457, from Yokoyama et al., 1990, "A Constraint–Based and Object–Oriented Knowledge Representation".

Inspec Abstract No. C90034818, from Q. Chen, 1988, "Extending the Object–Oriented Paradigm for Supporting Complex Objects".

Inspec Abstract No. C90030609, from Forde et al., 1990, "Object–Oriented Finite Element Analysis".

Inspec Abstract No. C90007733, from Weinand et al., 1989, "Design and Implementation of ET++, A Seamless Object–Oriented Application Framework".

Inspec Abstract No. C89062837, from Pasquier–Boltuck et al., 1988, "Prototyping an Interactive Electronic Book System Using an Object–Oriented Approach".

Inspec Abstract No. C89056727, from Campbell et al., 1989, "Principles of Object–Oriented Operating System Design".

Inspec Abstract No. C89056859, from Hull et al, 1989, "On Accessing Object–Oriented Databases: Expressive Power, Complexity, and Restrictions".

Inspec Abstract No. C89049257, from Madany et al., 1989, "Class Hierarchy for Building Stream–Oriented File Systems".

Inspec Abstract No. C89039001, from Brophy et al., 1989, "A Framework for Multiple, Concurrent Graphical Representation".

Inspec Abstract No. C89033226, from Corradi et al., 1988, "PO: An Object Model to Epxress Parallelism".

Inspec Abstract No. C89014870, from R. King, 1988, "Semantic and Object–Oriented Database Support for Software Environments".

Inspec Abstract No. 89003142, from Tenma et al., 1986, "A System for Generating Language–Oriented Editors".

Inspec Abstract No. C88013915, from Woelk et al., 1987, "Multimedia Information Management in an Object–Oriented Database System".

Inspec Abstract No. C88007447, from P. Allen, 1987, "A Framework for Implementing Multisensor Robotic Tasks".

Inspec Abstract No. C87007043, from Whitted et al., 1986, "Exploiting Classes in Modeling and Display Software".

Inspec Abstract No. C86039588, from K. Fukunaga., 1985; "Prompter: A Knowledge Based Support Tool for Code Understanding".

Inspec Abstract No. C86024804, from Greenspan et al., 1986, "A Requirements Modeling Language and Its Logic".

Inspec Abstract No. C84005713, from Meyer et al., 1983, "Towards a Two–Dimensional Programming Environment".

Inspec Abstract No. C81005505, from Mylopoulos et al., 1980, "Some Features of the TAXIS Data Model".

Inspec Abstract No. C86024804, from Greenspan et al., 1986, "A Requirements Modeling Language and Its Logic".

Inspec Abstract No. C84005713, from Meyer et al., 1983, "Towards a Two–Dimensional Programming Environment".

Inspec Abstract No. C81005505, from Mylopoulos et al., 1980, "Some Features of the TAXIS Data Model".

* cited by examiner

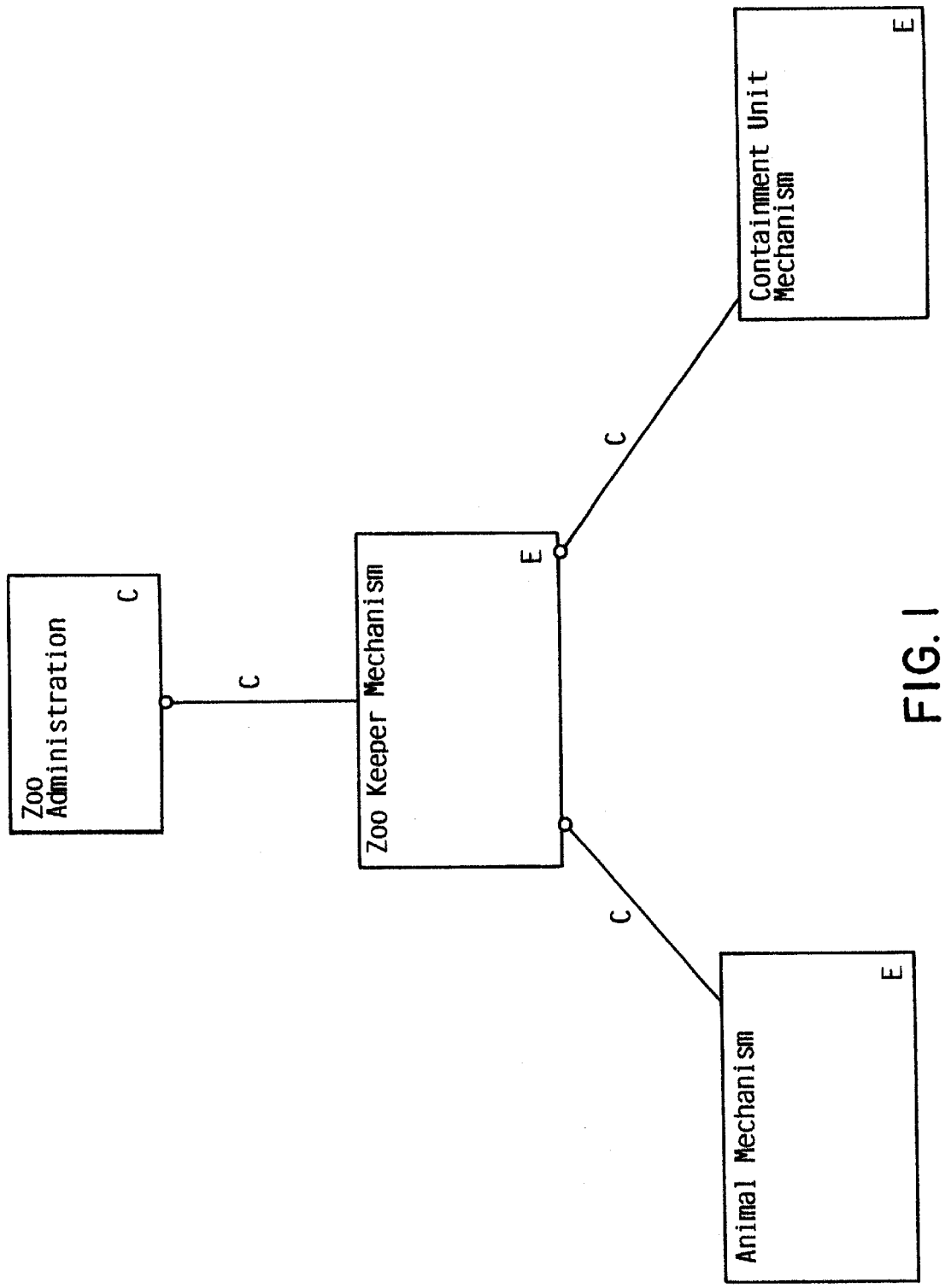

OBJECT-ORIENTED I/O DEVICE INTERFACE FRAMEWORK MECHANISM

FIELD OF THE INVENTION

The present invention relates in general to the data processing field. More specifically, the present invention relates to the field of input-output device interface mechanisms.

BACKGROUND OF THE INVENTION

The development of the EDVAC computer system of 1948 is often cited as the beginning of the computer era. Since that time, computer systems have evolved into extremely sophisticated devices. However, even today's most sophisticated computer systems continue to include many of the basic elements that were present in some of the first computer systems. Such elements include the computer system's processor, memory, and input-output devices (I/O devices for short). A computer system's processor is the intelligent portion of the computer system. The processor is responsible for executing programs that interpret and manipulate information that is given to the computer system by the computer system's user or users. I/O devices are extremely important because they play a major role in getting the necessary information into the computer system, storing the information, and making the information available to the computer system's users. After all, how valuable would a computer system be if there were no way to get information in or out? Example I/O devices include information entry and retrieval devices such as personal terminals and workstations, mass storage devices such as magnetic tape and disk devices, and output devices such as printers.

This patent document is primarily related to the operation and management of I/O devices on a computer system. While I/O devices are extremely important to what makes up a computer system, they are nevertheless perhaps the most difficult computer system entity to efficiently control and manage. This general I/O device problem stems largely from the fact that there are so many different types of I/O devices and that each device has so many different requirements. For example, managing a magnetic tape device is substantially different than managing a workstation). Of course, the problem is only made worse by the fact that there are many different models of I/O devices made by any number of makers.

Quite naturally, though, computer system users do not want to have to understand the particulars of a given type of device or have to understand the distinguishing characteristics of different models of any one device, yet the users still want to be able to make use of advanced devices and features very rapidly. The users want to be able to attach a new device to their computer system and have the computer system operate as if it had originally been designed to operate with this new device. If the new device is able to support existing features, the users would like those features to be available for use when the device is installed, without having to wait for their operating system provider to make the necessary programming changes. These user requirements pose a tremendous problem to the operating system provider because some changes require wholesale modifications to the programs that support the I/O devices.

Indeed, existing operating systems do not control and manage I/O devices in a way that satisfies these user requirements. New devices are often difficult to add because large portions of the computer system's programming must be changed to accommodate the addition. Similarly, new features of a recently upgraded I/O device are unavailable until the computer system's programming is changed to support those new features.

Without a mechanism that can shelter the user from the particulars of controlling and managing I/O devices, while still allowing for rapid changes to existing I/O devices and speedy addition of new I/O devices, the computer industry will continue to be plagued by the problems of managing and controlling these important computer system resources.

SUMMARY OF THE INVENTION

It is, therefore, a principal object of this invention to provide an enhanced I/O device interface mechanism that controls and manages I/O devices in a way that permits speedy change or addition of I/O devices.

It is another object of this invention to provide an enhanced object-oriented I/O interface framework mechanism.

It is still another object of this invention to provide an enhanced object-oriented I/O interface framework mechanism having core function that hides the details of interface hardware, protocols, initialization, and service strategies from the framework consumer in addition to extensible function that allows the consumer to add new I/O devices and make changes to existing I/O devices.

It is yet another object of this invention to provide an enhanced object-oriented I/O interface framework mechanism having objects that represent different I/O devices, objects that represent information about different I/O devices, objects that perform diagnostics on I/O devices, and objects that perform statistical analysis on I/O devices.

These and other objects of the present invention are accomplished by the I/O device interface framework apparatus disclosed herein.

As discussed in the Background section, there is serious need in the industry for a mechanism that provides for rapid changes to existing I/O devices and speedy addition of new I/O devices. These important benefits are provided by the I/O device interface framework of the present invention. The framework mechanism of the present invention was designed and constructed using object-oriented technology. Those who are unfamiliar with object-oriented technology, or with object-oriented framework mechanisms, should read the object-oriented overview section of the Description of the Preferred Embodiments section.

At the most general level, the framework mechanism of the present invention is made up of three interdependent controllers. These controllers are referred to herein as the hardware resource administrator, the information controller, and the device controller. The hardware resource administrator is responsible for organizing information about I/O devices and for making the organized information available to the other controllers. Therefore, the hardware resource administrator is comprised of objects that work together to 1) identify the various I/O devices on the computer system, 2) find and filter I/O device information such that it is in a form that is of value to the other controllers, and 3) notify objects of the other controllers of changes in the status of any of the computer system's I/O devices. Since the hardware resource administrator is essentially an internal service mechanism, it is designed to be a core function of the framework mechanism. This means that the hardware resource administrator is a part of the framework mechanism that shelters users and system administrators from the particulars of controlling and managing I/O devices. As such, the hardware administrator has been designed such that it is not to be subject to extension or customization by the framework consumer.

The information controller is responsible for gathering information about I/O devices and for changing and/or updating certain I/O device information. Accordingly, the information controller is made up of individual objects that each represent the characteristics of a particular I/O device. Each of these objects depends upon hardware resource administrator and device controller objects to gather representative information about individual I/O devices. Since each of the individual information controller objects is representative of an individual device, the information controller has been designed as an extensible function of the framework mechanism. This means that the information controller is a part of the framework mechanism that provides for rapid changes to existing I/O devices and speedy addition of new I/O devices. As such, the information controller has been designed such that it can be extended and/or customized by the framework consumer.

The device controller is responsible for controlling the actual operation of the individual devices, and for performing statistical and diagnostic analysis on the individual I/O devices. Accordingly, the device controller is made up of objects that work together to perform all of these functions. Certain device controller objects rely on hardware resource administrator objects to identify individual information controller objects and on the individual information controller objects to discern particular information about the individual devices themselves.

Unlike the hardware administrator, the device controller has been designed to have both core and extensible function. Essentially, the core function is the way in which the objects of the device controller interact to control the I/O device and to perform statistical and diagnostic analysis. The extensible function, on the other hand, allows the framework consumer to quickly add or change I/O devices. Since the device controller is made up of both core and extensible function, parts of the device controller have been designed such that they can be extended and/or customized by the framework consumer, while other parts have been designed such that they are not to be subject to extension or customization by the framework consumer.

DESCRIPTION OF THE PREFERRED EMBODIMENTS

Overview—Object-Oriented Technology

Figure 2:
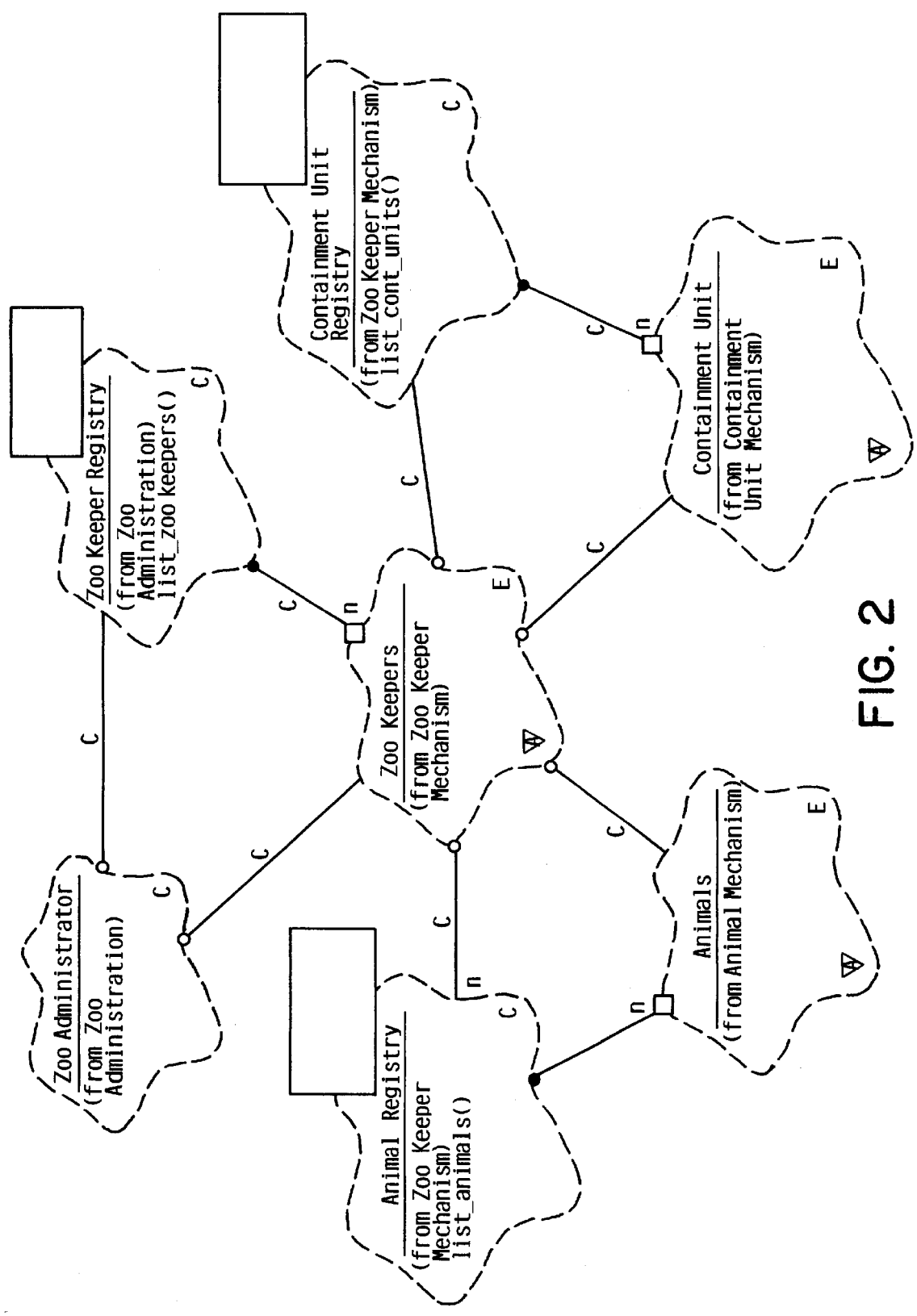
FIGS. 2 through 6 are class diagrams for the example framework mechanism of FIG. 1.

As discussed in the Summary section, the present invention was developed using Object-oriented (OO) framework technology. Individuals skilled in the art of OO framework technology may wish to proceed to the Detailed Description section of this specification. However, those individuals who are new to framework technology, or new to OO technology in general, should read this overview section in order to best understand the benefits and advantages of the present invention.

Object-oriented Technology v. Procedural Technology

Though the present invention relates to a particular OO technology (i.e., OO framework technology), the reader must first understand that, in general, OO technology is significantly different than conventional, process-based technology (often called procedural technology). While both technologies can be used to solve the same problem, the ultimate solutions to the problem are always quite different. This difference stems from the fact that the design focus of procedural technology is wholly different than that of OO technology. The focus of process-based design is on the overall process that solves the problem; whereas, the focus of OO design is on how the problem can be broken down into a set of autonomous entities that can work together to provide a solution. The autonomous entities of OO technology are called objects. Said another way, OO technology is significantly different from procedural technology because problems are broken down into sets of cooperating objects instead of into hierarchies of nested computer programs or procedures.

The Term Framework

There has been an evolution of terms and phrases which have particular meaning to those skilled in the art of OO design. However, the reader should note that one of loosest definitions in the OO art is the definition of the word framework. The word framework means different things to different people. Therefore, when comparing the characteristics of two supposed framework mechanisms, the reader should take care to ensure that the comparison is indeed "apples to apples." As will become more clear in the forthcoming paragraphs, the term framework is used in this specification to describe an OO mechanism that has been designed to have core function and extensible function. The core function is that part of the framework mechanism that is not subject to modification by the framework purchaser. The extensible function, on the other hand, is that part of the framework mechanism that has been explicitly designed to be customized and extended by the framework purchaser.

OO Framework Mechanisms

While in general terms an OO framework mechanism can be properly characterized as an OO solution, there is nevertheless a fundamental difference between a framework mechanism and a basic OO solution. The difference is that framework mechanisms are designed in a way that permits and promotes customization and extension of certain aspects of the solution. In other words, framework mechanisms amount to more than just a solution to the problem. The mechanisms provide a living solution that can be customized and extended to address individualized requirements that change over time. Of course, the customization/extension quality of framework mechanisms is extremely valuable to purchasers (referred to herein as framework consumers) because the cost of customizing or extending a framework is much less than the cost of a replacing or reworking an existing solution.

Therefore, when framework designers set out to solve a particular problem, they do more than merely design individual objects and how those objects interrelate. They also design the core function of the framework (i.e., that part of the framework that is not to be subject to potential customization and extension by the framework consumer) and the extensible function of the framework (i.e., that part of the framework that is to be subject to potential customization and extension). In the end, the ultimate worth of a framework mechanism rests not only on the quality of the object design, but also on the design choices involving which aspects of the framework represent core function and which aspects represent extensible function.

ZAF—An Illustrative Framework Mechanism

While those skilled in the art appreciate that framework design is necessarily an intertwined and iterative process, example design choices for a simplistic framework mechanism are set forth in the paragraphs that follow. It should be understood, though, that this is only an example framework that is being used in this specification to illustrate and best explain framework mechanisms such that the reader can understand and appreciate the benefits and advantages of the present invention.

Framework designers determine what objects are needed for a framework mechanism by selecting objects from what is called the problem domain. The problem domain is an abstract view of the specific problem at hand. The example problem domain chosen for this illustrative framework mechanism is that of zoo administration. The specific problem is that of designing a mechanism that assists zoo keepers in the care and feeding of zoo animals. In our example of a Zoo Administration Framework (ZAF), an OO framework designer would look to the zoological problem domain and decide that any ZAF would of necessity involve a mechanism that represented the relationship between zoo keepers and animals (i.e., to represent how zoo keepers care for animals). The framework designer would also likely recognize that zoo animals usually live in cages, pens, tanks, and other sorts of containment units. Therefore, our framework designer would start with the idea that the framework would have to involve mechanisms that represented all of these fundamental entities and relationships.

How ZAF is Designed

Figures 1, 12A:
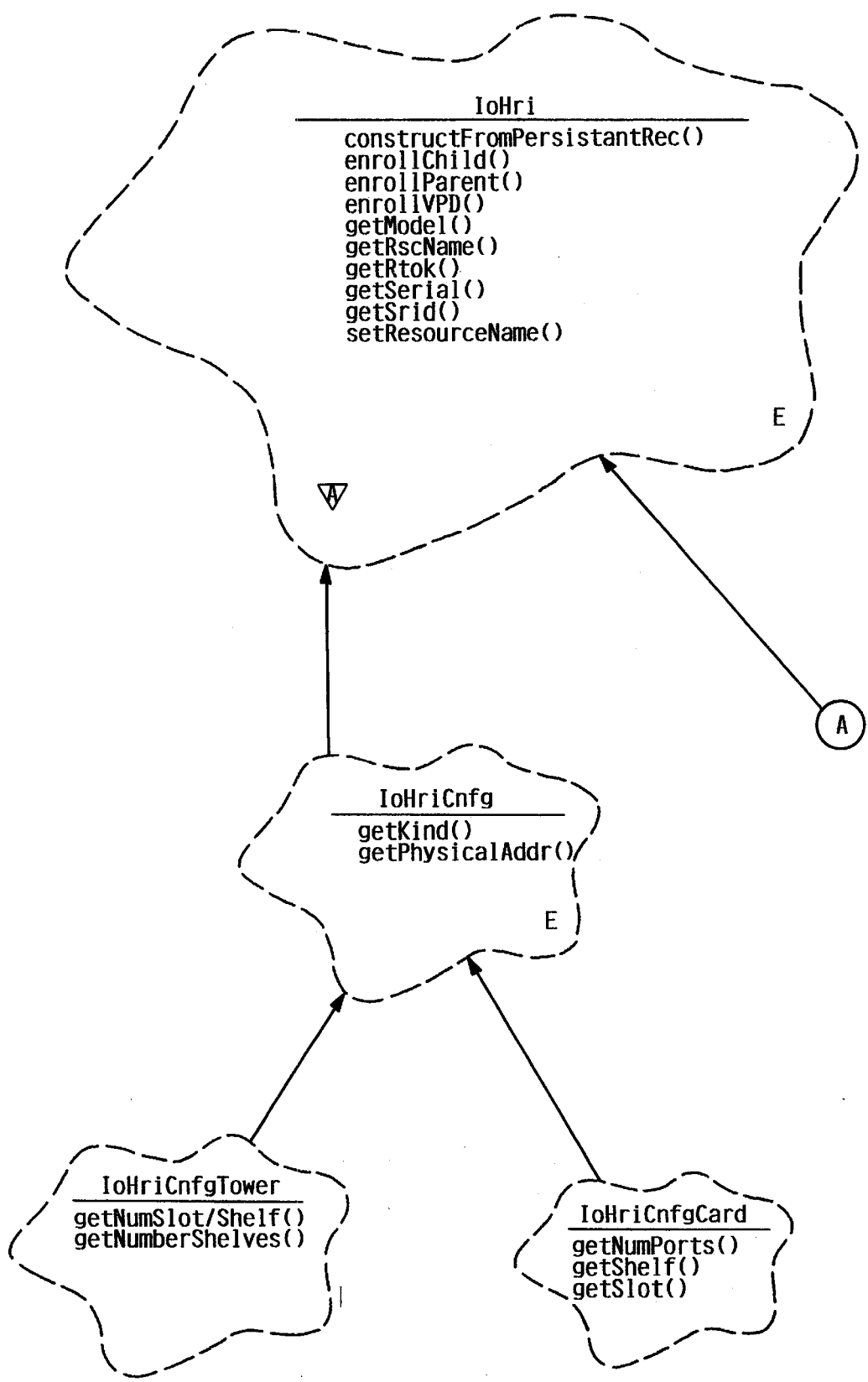
FIG. 1 is a category diagram of an example framework mechanism.
Figures 2, 12A:
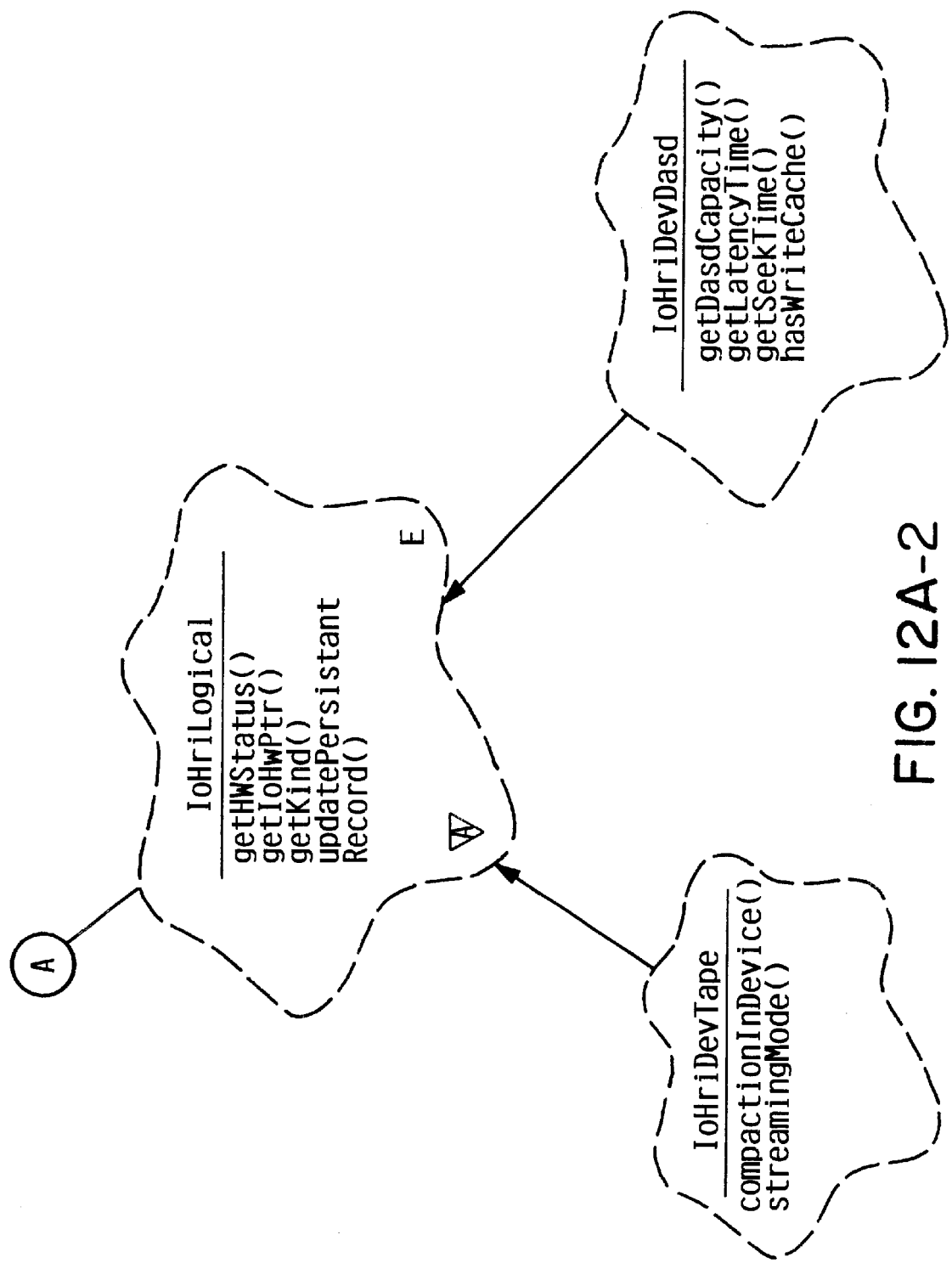

To begin the design process, our framework designer would likely begin with what is called a category diagram. Category diagrams are used to describe high level framework mechanisms, and how those mechanisms relate to one another. FIG. 1 is a category diagram for the example framework ZAF. The notation used in FIG. 1, and that used in the other figures of this specification, is explained in detail in the Notation section at the end of this specification (pages X–Y). Each mechanism in a category diagram represents groupings of objects that perform a particular function. For the purposes of illustration, assume that our framework designer decides that ZAF should be made up of four high level mechanisms: a zoo administration mechanism, a zoo keeper mechanism, an animal mechanism, and a containment unit mechanism.

As shown in FIG. 1, the zoo administration mechanism has been designed to use the zoo keeper mechanism to administer the zoo. The zoo administration mechanism is therefore said to have a using relationship with the zoo keeper mechanism. (Again, please refer to the notation section of this specification for an explanation of this relationship and the other notation used in this specification.)

As discussed, the zoo administration mechanism has been designed to have responsibility for overall control of ZAF. Accordingly, the zoo administration mechanism is responsible for scheduling the operation of the zoo keeper mechanism. Note also that our framework designer designed the zoo administration mechanism to be a core function of ZAF, which means that it has been designed such that it will not be subject to potential customization and extension. The C in the category box denotes this fact. Please note further that the uses relationship between the zoo administration mechanism and the zoo keeper mechanism has also been designed such that it is not available for ultimate customization by the framework consumer.

The zoo keeper mechanism has been designed to be generally responsible for the care and feeding of the zoo animals. Accordingly, it uses the animal and containment unit mechanisms to perform its tasks. However, unlike the design of the zoo administration mechanism, our framework designer has designed the zoo keeper mechanism to be extensible function, which again means that the zoo keeper mechanism has been designed to be available for modification and/or extension by the framework consumer to address future care and feeding requirements. This fact is denoted by the E in the zoo keeper mechanism category box.

Our framework designer has designed the animal mechanism to represent the animal side of the interaction between zoo animals and zoo keepers. Since the animal population in the zoo is something that changes on a regular basis, the animal mechanism has similarly been designed as an extensible function. The containment unit mechanism interacts with the zoo keeper mechanism by representing individual containment units such as pens, tanks, and cages. Like the animal mechanism, the containment unit mechanism has been designed as an extensible function such that it can handle future customization and extension requirements. Please note here, however, that even though the zoo keeper, zoo animal, and containment unit mechanisms have all been designed as extensible function, the relationships between the mechanisms have been designed to be a core function of ZAF. In other words, even though it is desirable to give ZAF's consumers flexibility relative to the zoo keeper, zoo animal, and containment unit mechanisms, it is not desirable to allow ZAF's consumers to change how these mechanisms relate to one another.

Our framework designer would next design the classes and relationships that make up the mechanisms shown on FIG. 1. A class is a definition of a set of like objects. As such, a class can be thought of as an abstraction of the objects or as a definition of a type of object. From the view of a computer system, a single object represents an encapsulated set of data and the operation or a group of operations that are performed by a computer system upon that data. In fact, in a secure computer system, the only access to the information controlled by an object is via the object itself. This is why the information contained in an object is said to be encapsulated by the object.

Each class definition comprises data definitions that define the information controlled by the object and operation definitions that define the operation or operations performed by objects on the data that each object controls. In other words, a class definition defines how an object acts and reacts to other objects by defining an operation or set of operations that is/are performed on the defined data. (Please note that operations are sometimes called methods, method programs, and/or member functions.) When taken together, the defined operation(s) and data are said to be the behavior of the object. In essence, then, a class definition defines the behavior of its member object or objects.

FIG. 2 is an OO class diagram that shows the fundamental classes that our framework designer has designed for ZAF. Each class representation includes its relationship to the mechanisms shown on FIG. 1. For example, we can see that the zoo keepers class is denoted as being from Zoo Keeper Mechanism. The fundamental classes of ZAF include: the zoo administrator class, which is part of the zoo administration mechanism; the zoo keeper registry class, which is also part of the zoo administration mechanism; the animal registry class, which is part of the zoo keeper mechanism; the zoo keepers class, which is also part of the zoo keeper mechanism; the containment unit registry class, which is also part of the zoo keeper mechanism; the animals class, which is part of the animal mechanism; and the containment unit class, which is part of the containment unit mechanism.

Please note again that the relationships between the classes have been designed as core function of ZAF such that they are not available for ultimate modification by ZAF's consumers.

The zoo administrator class is the definition of the object that is responsible for the overall control of ZAF. Again, OO classes only define the objects that interact to provide a solution to the problem. However, it is by exploring the characteristics of the class definitions that we are able to understand how the objects of the framework mechanism have been designed to provide a living solution that can be customized and/or extended to address future requirements.

The zoo administration class has been designed to have a uses relationship with the zoo keeper registry. Our framework designer has designed the zoo administration and zoo registry classes to be a core function of ZAF because our designer has decided that ZAF's consumers should not be allowed to modify the behavior of objects that are members of these class definitions. The zoo keeper registry, which has what is called a contains by reference relationship with the zoo keeper class, is simply a class that defines an object that is a container for all zoo keeper objects. Accordingly, the zoo keeper registry includes a definition for a list_zoo_keepers( ) operation. As will be described later, this operation is responsible for providing a list of zoo keeper objects to other objects that request such a list.

Figure 3:
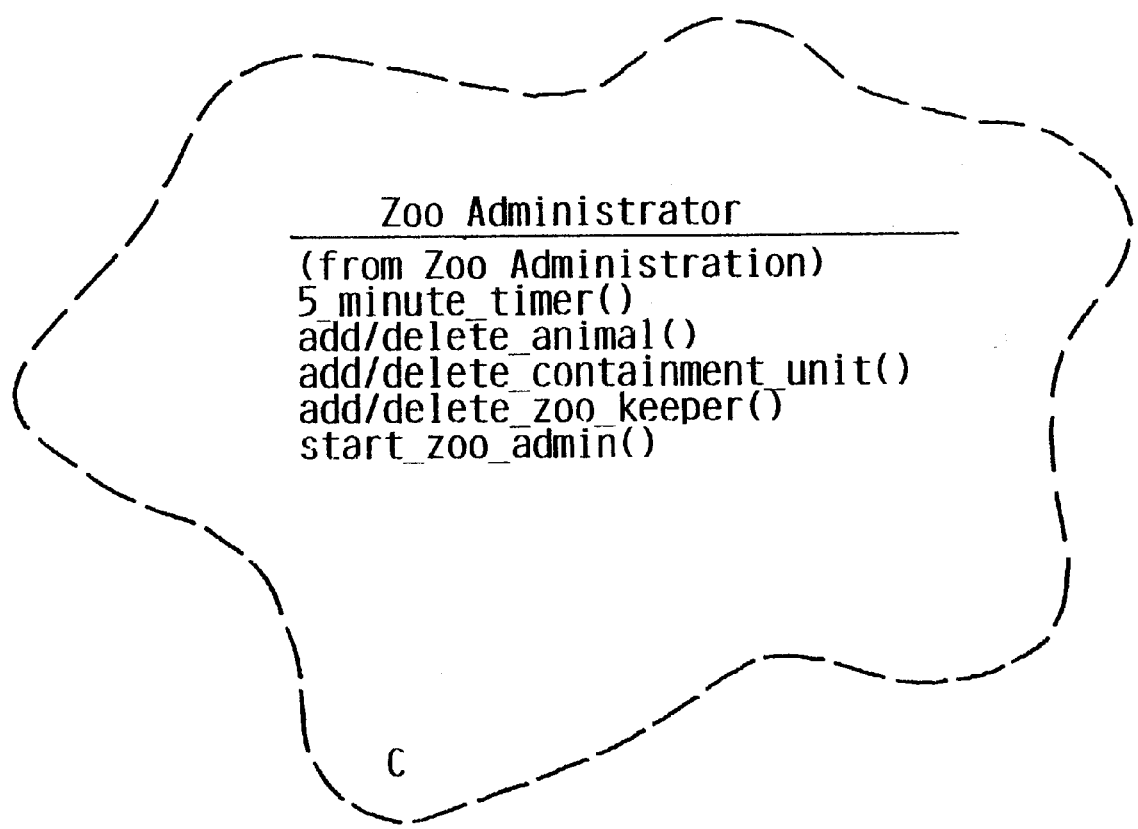

FIG. 3 shows a lower level view of the zoo administrator class. Since objects of type zoo administrator have responsibility for overall control of ZAF, the zoo administrator class has been designed to include operations that perform tasks oriented towards zoo administration. The class definition includes the following five operations: 5_minute_timer( ), add_animal( ) add_containment_unit( ), add_zoo_keeper( ), and start_zoo_admin( ).

The start_zoo_admin( ) operation is responsible for starting ZAF. That is, a user or system administrator will interact with the start_zoo_admin( ) operation to begin administration of a zoo via ZAF. Once started, our framework designer has designed the start_zoo_admin( ) operation to initiate the 5_minute_timer( ) operation. Every five minutes, the 5_minute_timer( ) operation instructs the zoo keeper objects to go out and check on the animals. The add/delete_zoo_keeper operation is responsible for interacting with users of ZAF to define additional zoo keepers (i.e., additional zoo keeper classes), to add additional zoo keepers (i.e., zoo keeper objects), and to remove zoo keeper classes and/or objects. As will become clear in the forthcoming paragraphs, each zoo keeper object is responsible for performing a particular zoo task. Therefore, it is natural that a user of ZAF might well want to add a zoo keeper definition and object to handle an additional zoo task or to remove a definition or object that is no longer needed. As will be seen, this flexibility is provided by designing the zoo keeper mechanism as an extensible function.

Like the add/delete_zoo_keeper operation, the add/delete_animal( ) operation is responsible for interacting with users to define additional zoo animal classes and objects and to remove classes and objects that are no longer needed. Again, it is quite natural for a zoo to need to add and remove animals. The add/delete_containment_unit( ) operation is responsible for the definition of new containment unit classes and objects and for removal of classes and/or objects that are no longer necessary. Again, our framework designer has designed ZAF in a way that provides this flexibility by designing the animal and containment unit mechanisms as an extensible functions.

Referring back to FIG. 2, the zoo keepers class definition has a uses relationship with the animal registry, animals, containment unit registry, and containment units classes. Since the value of ZAF is enhanced by allowing ZAF's consumers to customize and extend the zoo keepers, animals, and containment unit classes, these classes have been designed as extensible function. However, changing the behavior of the animal and containment unit registry classes would disrupt the basic operation of ZAF. Therefore, these classes have been designed to be core functions of ZAF.

Figure 4:
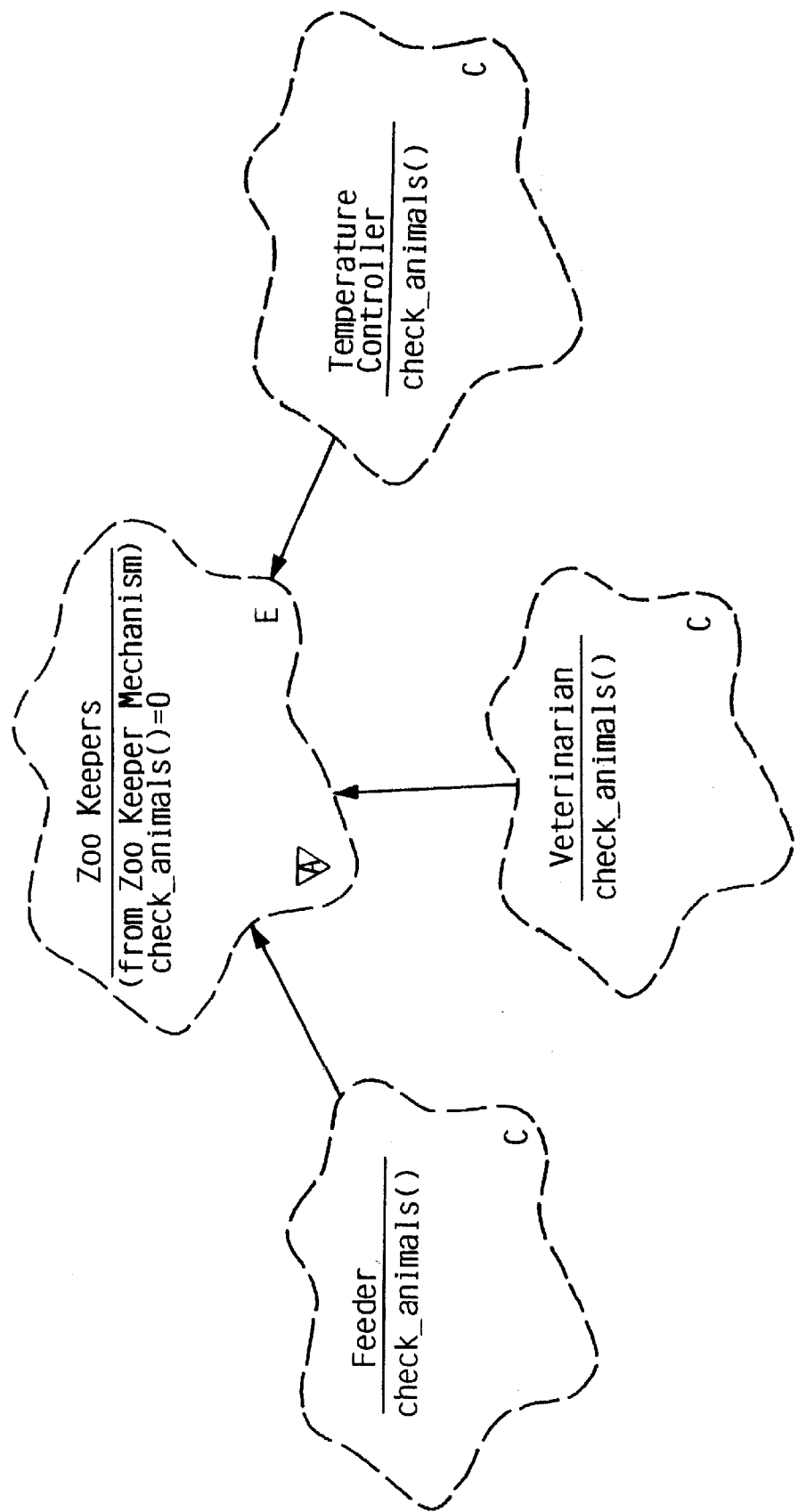

FIG. 4 is a class diagram of the zoo keeper class. However, before describing the details of FIG. 4, it is worthwhile to point out that the class definitions shown on FIG. 4 are ranked in a very simple ordering called a class hierarchy. A class, like the zoo keeper class, that represents the most generalized/abstract class in a class hierarchy is referred to as the base class of the hierarchy. The ordering of classes in a class hierarchy goes from most general to least general (i.e., from general to specific). Less general classes (e.g., the feeder class) are said to inherit characteristics from the more general class or classes (i.e., the zoo keeper class in this case). As such, class definitions feeder, veterinarian, and temperature controller are said to be subclasses of the zoo keeper class. Inheritance mechanisms will be explored in more detail in the discussion associated with FIG. 5.

As shown on FIG. 4, the zoo keeper class definition contains a single operation definition, the check_animals( ) operation definition. The reader should also note that the zoo keepers class definition is marked as being an abstract class. Abstract classes are not designed to have objects created as their members, but are instead used to define a common interface/protocol for their subclasses. A class is said to be an abstract class when at least one of its operation definitions is a pure virtual operation definition. Pure virtual operation definitions are designed for the sole purpose of defining a common interface for subclass definition of that operation. In other words, the design of the actual behavior (i.e., the data and operations) is left to the subclasses themselves. In the case of the zoo keeper class definition, the feeder, veterinarian, and temperature controller subclasses define specific implementations of the pure virtual check_animals( ) operation definition that is contained in the zoo keeper class. An operation is marked as a pure virtual when it is set equal to 0.

It is important to note, though, that the common interface of a pure virtual operation definition must be honored by all subclasses such that requesting objects (called client objects) can use subclass member objects (called server objects) without needing to know the particular subclass of the server object. For example, whenever the object defined by the zoo administrator class needs a particular action performed, it interacts with a zoo keeper object. Because the interface to these objects was defined in abstract, base class zoo keeper and preserved in the subclass definitions for the check_animals( ) operation, the zoo administrator object need not have special knowledge about the subclasses of any of the server objects. This has the effect of decoupling the need for the action (i.e., on the part of the zoo administrator object) from the way in which the action is carried out (i.e., by one of the objects of the zoo keepers subclasses). Designs (like the ZAF design) that take advantage of the characteristics of abstract classes are said to be polymorphic.

Polymorphism is extremely important to OO framework design because it allows the way in which something is done (called the implementation) to be changed or extended without effecting the mechanisms that depend on the fact the action is actually performed. In other words, client objects need only understand that certain objects perform certain functions, not how those functions are actually carried out. This is one way in which a properly designed framework can be readily customized and extended to satisfy future requirements.

Figure 5:
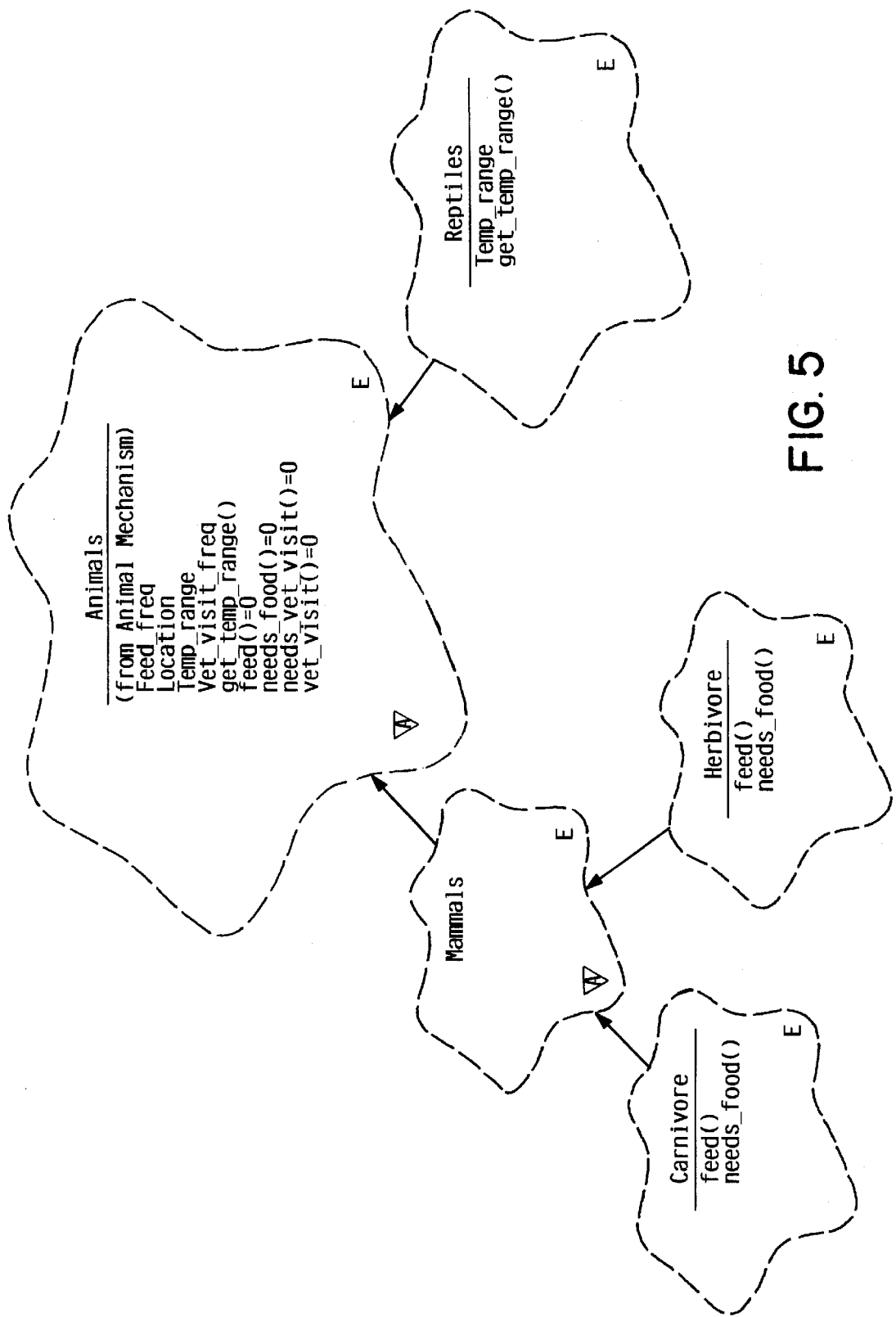

As previously discussed, our framework designer has designed ZAF such that zoo keeper objects interact with animal and containment unit objects to perform their tasks. FIG. 5 is a class diagram for the class hierarchy of the abstract class animal. Since the animals class definition is responsible for representing the characteristics and behavior of zoo animals, the framework designer has designed abstract class animal in a way that reflects this responsibility. As shown, the example animal class definition includes data definitions feed_freq, location, and temp_range and operation definitions get_temp_range( ), feed( ), needs_food( ), needs_vet_visit( ), and vet_visit( ).

For the purposes of this framework overview, it is not necessary to explore each definition in detail. However, the temp_range data definition and the get_temp_range( ) and feed( ) operation definitions are good examples of well thought out framework design choices.

The feed( ) operation definition is designed to perform the actual feeding of the animals (i.e., through specific feeding apparatus which is not shown). The feed( ) operation is a pure virtual operation. Again, this means that the design of the class is such that the actual mechanism that performs the needed function has been left to be defined by the subclasses. Requiring subclass definition is a good design choice in cases like this where objects that are created as members of the subclasses have particularized needs. In ZAF, for example, each type of animal is likely to have need for a particularized feeding apparatus, which not only makes definition of a generic feed( ) operation difficult, but valueless.

By way of comparison, the framework designer has explicitly designed the get_temp_range( ) operation such that it is not a pure virtual operation definition. This means that get_temp_range( ) has been generically defined as a default operation. As such, it is considered a virtual operation. Default operations are used to provide generic function to subclasses. The subclasses can simply use the default operations or they can customize or extend the default operations by redefinition. Redefinition of a default operation is called overriding the default operation.

Mammals is a subclass of class animals, and as such, mammals inherits all of the characteristics of class animals. Please note that class mammals is also designed as an abstract class, which again means that it has not been designed to have objects created as its members, but has instead been designed to provide a common interface for its subclasses. Subclass mammal is further subclassed into classes carnivore and herbivore.

Since definition of the feed( ) operation has been left up to the subclasses, subclasses carnivore and herbivore each have their own definition of the feed( ) operation. Again, this is a good design choice because meat eating carnivores are going to have different needs than their plant eating counterparts.

Temp_range is a data definition for the range of temperatures that coincides with that of the specific animal's natural habitat and the get_temp_range( ) operation definition is designed to retrieve the temp_range for a specific animal and return it to a requesting client object. Subclass reptiles contains its own data definition for temp_range and its own definition for the get_temp_range( ) operation. ZAF has been designed this way to point out that data definitions can be overridden just like operation definitions. Since many reptiles live in desert conditions, where nights can be very cold and days very hot, the default temp_range definition has been overridden in the reptiles class to include time and temperature information (not explicitly shown on FIG. 5). This is another good design choice because it allows ZAF to treat reptile containment units differently than other containment units by allowing temperature adjustments to be made based on the time of day as well as on the current temperature of the containment unit itself.

Figure 6:
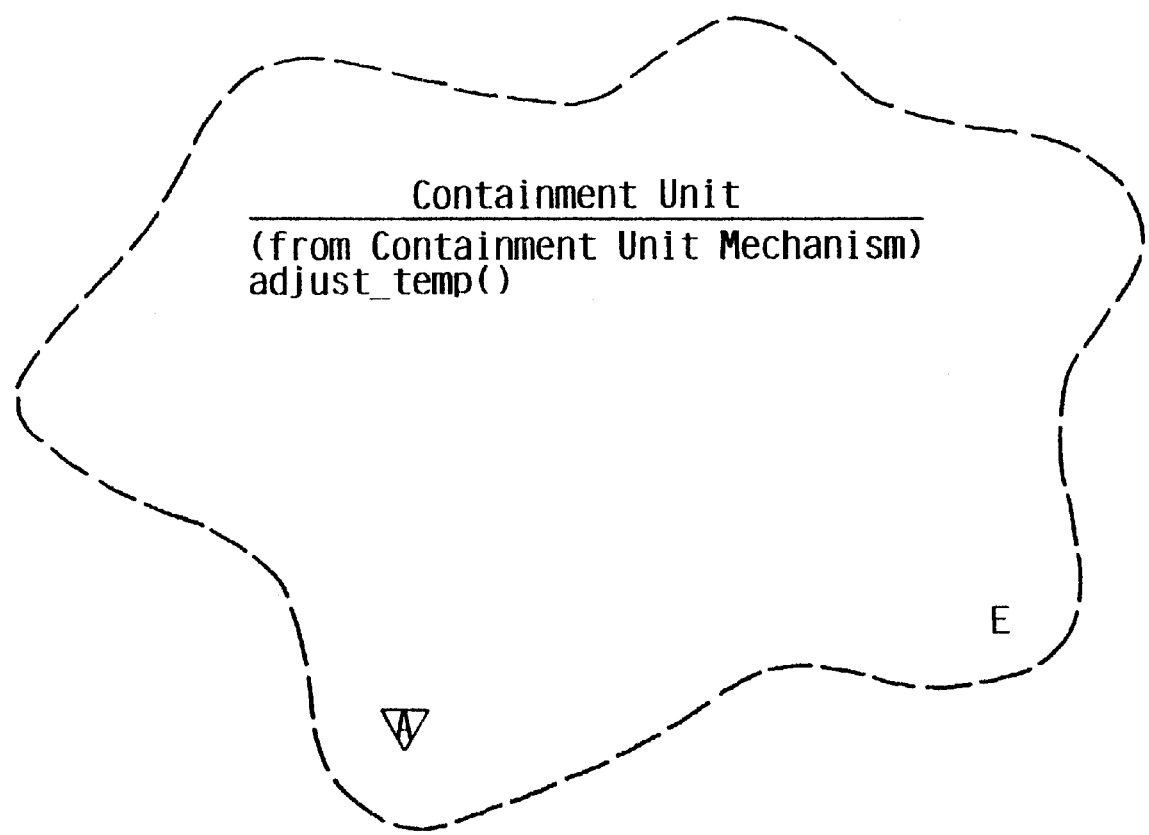

FIG. 6 is a class diagram showing a lower level view of the containment unit class. The containment unit class contains virtual operation definition adjust_temp( ). The adjust_temp definition defines both the interface and mechanism used to actually adjust the temperature in the containment units of the zoo (i.e., via heating and cooling mechanisms which are not shown).

How the ZAF Objects Interact

Beyond designing the objects that make up the solution to the specific problem, our framework designer must also design how the individual objects interrelate. In other words, the objects must interrelate in way that takes advantage of the manner in which they were designed. As discussed, the way in which the defined operations of an object operate on the data defined for the object is called the object's behavior. While objects may be characterized as autonomous entities, it is still very important that each object exhibit a consistent behavior when interrelating with other objects. Consistent behavior is important because objects depend upon the consistent behavior of other objects so that they themselves can exhibit consistent behavior. In fact, consistent behavior is so important that an object's behavior is often referred to as the contract the object has with the other objects. When an object does not exhibit a consistent behavior, it is said to have violated its contract with the other objects.

When an operation of one object needs access to the data controlled by a second object, it is considered to be a client of the second object. To access the data controlled by the second object, one of the operations of the client will call or invoke one of the operations of the second object to gain access to the data controlled by that object. One of the operations of the called object (i.e., a server operation in this case) is then executed to access and/or manipulate the data controlled by the called object.

Figure 7:
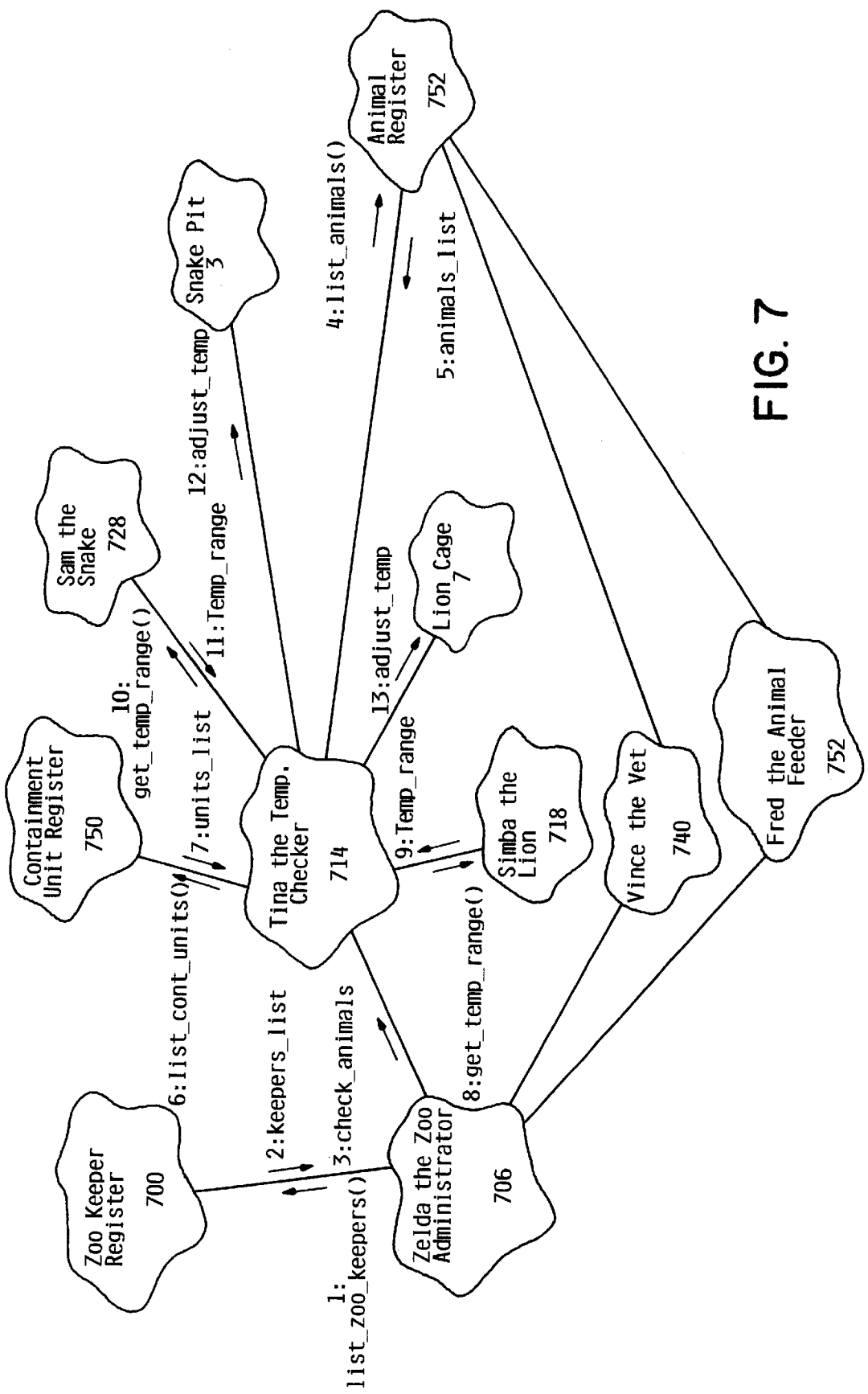
FIG. 7 is an object diagram for the example framework mechanism of FIGS. 1 through 6.

FIG. 7 is an object diagram showing how the example objects of ZAF interact to assist zoo personnel in operating the zoo. A detailed analysis of the interaction of all of the ZAF objects is unnecessary for the purposes of this overview. However, the reader should review the following simple control flow to obtain a rudimentary understanding of how objects interact to solve problems.

As mentioned, an object is created to be a member of a particular class. Therefore, Zelda the Zoo Administrator [object 706] is an object that is a member (actually the only member) of the zoo administrator class. As such, object Zelda is responsible for overall control of ZAF. All of the zoo keeper objects have registered with the Zoo Keeper Register object [object 700]. Therefore, object Zelda obtains a list of the current zoo keepers by calling the list_zoo_ keepers( ) operation [step 1] of the Zoo Keeper Register object. The Zoo Keeper Register object has been created as a member of the zoo keeper register class. For the purposes of illustration, assume that this occurs every five minutes as part of Zelda's 5_minute_timer( ) operation. The Zoo Keeper Register object then responds with the zoo keepers list [step 2]. The list of zoo keepers includes Tina the Temperature Checker [object 714], Vince the Vet. [object 740], and Fred the Animal Feeder [object 752]. Each zoo keeper has been created as a member of the zoo keepers class. In particular, objects Tina the Temp. Checker, Vince the Vet., and Fred the Feeder are respectively members of the temperature controller, veterinarian, and feeder subclasses.

Once the list of current zoo keepers has been returned to object Zelda, object Zelda instructs each zoo keeper in the list to check the animals by calling the check_animals( ) operation of each zoo keeper object [only the call to Tina the Temp. Checker is shown—step 3]. Please note that object Zelda did not need to understand the types of zoo keepers that were in the zoo keeper list, the number of zoo keeper objects in the list, or the specialized characteristics of any one zoo keeper object. Object Zelda uses the same interface (i.e., the check_animals( ) operation) to communicate with each zoo keeper object. It is then up to the individual zoo keeper objects to perform the task for which they have been created. Each zoo keeper object performs its assigned task through use of its own check_animals( ) operation. For example, object Tina's check_animals( ) operation retrieves a list of current animals from the animal registry object by calling the list_animals( ) operation [step 4] and then a list of containment units from the containment unit register object by calling the list_cont_units( ) operation [step 6]. Upon examining the animal list, object Tina's check_animals( ) operation determines that there are only two animals currently registered in the zoo, Sam the Snake [object 728] and Simba the Lion [object 718].

Object Tina's check_animals( ) operation then calls the get_temp_range( ) operations to get temperature ranges from objects Sam and Simba [steps 8 and 10]. Once the temperature ranges have been returned, the check_animals( ) operation of object Tina determines which containment units house the respective animals (i.e., Simba and Sam) and then calls the adjust_temp( ) operation of the appropriate containment unit (i.e., Lion Cage 7 in the case of object Simba and Snake Pit 3 in the case of object Sam) to adjust the temperature of the containment units [steps 12 and 13].

The adjust-temp( ) operation of each containment unit then completes the control flow by proceeding to adjust the temperature in a way that is appropriate for the animals contained in each containment unit. (That is, the temperature is adjusted based on time and temperature for Snake Pit 3 and based on time alone for Lion Cage 7.) The reader should note that the relationship between the check_animals( ) operation and the adjust temp( ) operations is polymorphic. In other words, the check_animals( ) operation of object Tina does not require specialized knowledge about how each adjust_temp( ) operation performs its task. The check_animals( ) operation merely had to abide by the interface and call the adjust_temp( ) operations. After that, it is up to the individual adjust_temp( ) operations to carry our their tasks in the proper manner.

At this point, it is again worthwhile to point out that the ZAF mechanism is an extremely simplistic framework mechanism that has been presented here to help novice readers understand some basic framework concepts so as to best appreciate the benefits and advantages of the present invention. These benefits and advantages will become more clear upon reference to the following Detailed Description. although the bus of the preferred embodiment is a typical hardwired, multidrop bus, any connection means that supports bi-directional communication could be used.

Data storage 840 contains application programs 810, operating system 865 and I/O device framework mechanism 813 (the terms I/O framework mechanism 813, framework mechanism 813, I/O framework 813 and framework 813 should be considered to have equivalent meaning). However, those skilled in the art will appreciate that the present invention is capable of being distributed as a program product via floppy disk, CD ROM, or other form of recordable media or via any type of electronic transmission mechanism.

Application programs 810 are programs that have been written to interact with the I/O devices of computer system 800. In the preferred embodiment, this interaction takes place via a set of operating system interfaces, although those skilled in the art will appreciate that there would be nothing to prevent the client programs of application programs 810 from interfacing directly with I/O framework 813. Indeed, for the purposes of explanation much of the following description is written as if the client programs of application programs 810 interacted directly with the operations supplied by I/O framework 813. Those skilled in the art will appreciate that the way in which any particular operating system converts client program requests into the actual invocations of I/O framework operations is not important to understanding the I/O framework mechanism of the present invention.

Class Definitions

Figure 9:
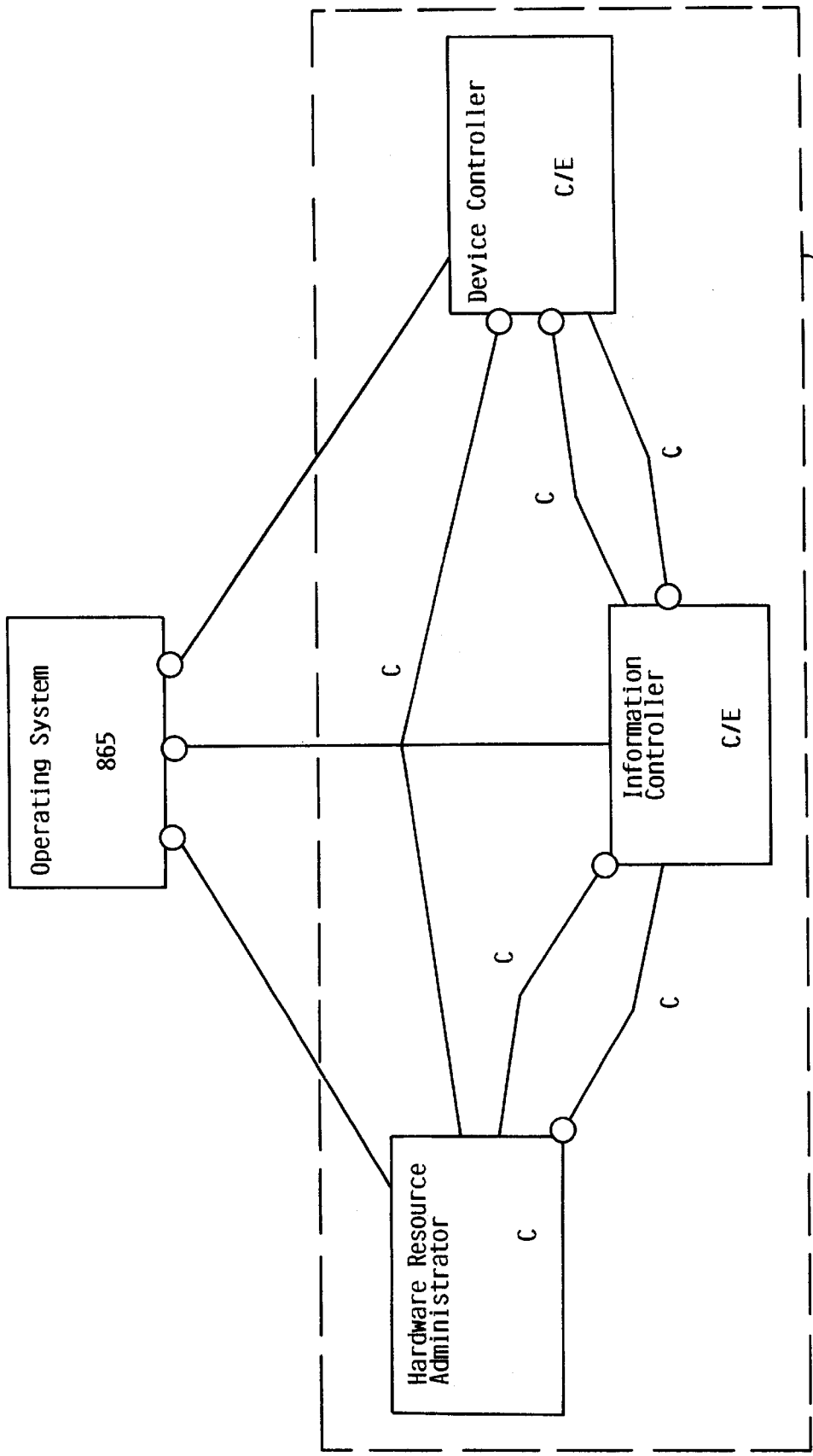
FIG. 9 is a category diagram of a framework mechanism constructed in accordance with the teachings of the present invention.

FIG. 9 is a category diagram of I/O framework mechanism 813. As described in the Summary section, and as shown on FIG. 9, I/O framework 813 is comprised of a hardware resource administrator, an information controller, and a device controller. The hardware administrator, which is core function of framework 813, has a uses relationship with the information controller. For an explanation of the uses relationship and the other notation used in this specification, please refer to the Notation section of this specification. The Notation section begins after this section (the Detailed Description section). The information controller, which is core and extensible function of framework 813, has a uses relationship with the hardware administrator and a uses relationship with the device controller. The device controller, which comprises both core and extensible function, has a uses relationship with the hardware resource administrator and a uses relationship with the information controller.

Operating system 865 is shown to have a uses relationship with all three framework controllers. As mentioned, operating system 865 is what the client programs of application programs 810 rely upon to access the facilities provided by I/O framework 813, and ultimately, the facilities provided by the I/O devices themselves. At this point, it should be pointed out that I/O framework mechanism 813 is operating system independent. In other words, I/O framework mechanism 813 is designed such that it does not depend upon any traditional operating system function to perform its tasks, which means that it can provide the low level I/O function for any operating system. However, this does not mean that certain operating system functions would not need to be modified to make use of the benefits and advantages of the I/O framework of the present invention. Remember, though, that those benefits. and advantages include the ability to add new I/O devices and the ability to change the configuration of existing devices without having to make extensive changes to the hose operating system or to the I/O framework mechanism itself.

In the preferred embodiment, operating system 865 is IBM OS/400, though, as mentioned, any operating system could be made to work with I/O framework mechanism 813. Further, the fact that operating system 865 is shown as a category in the Booch notation should not be taken to mean that OS/400 is an object-oriented operating system or that only object-oriented operating systems can take advantage of the benefits of the present invention.

DETAILED DESCRIPTION

Figure 8:
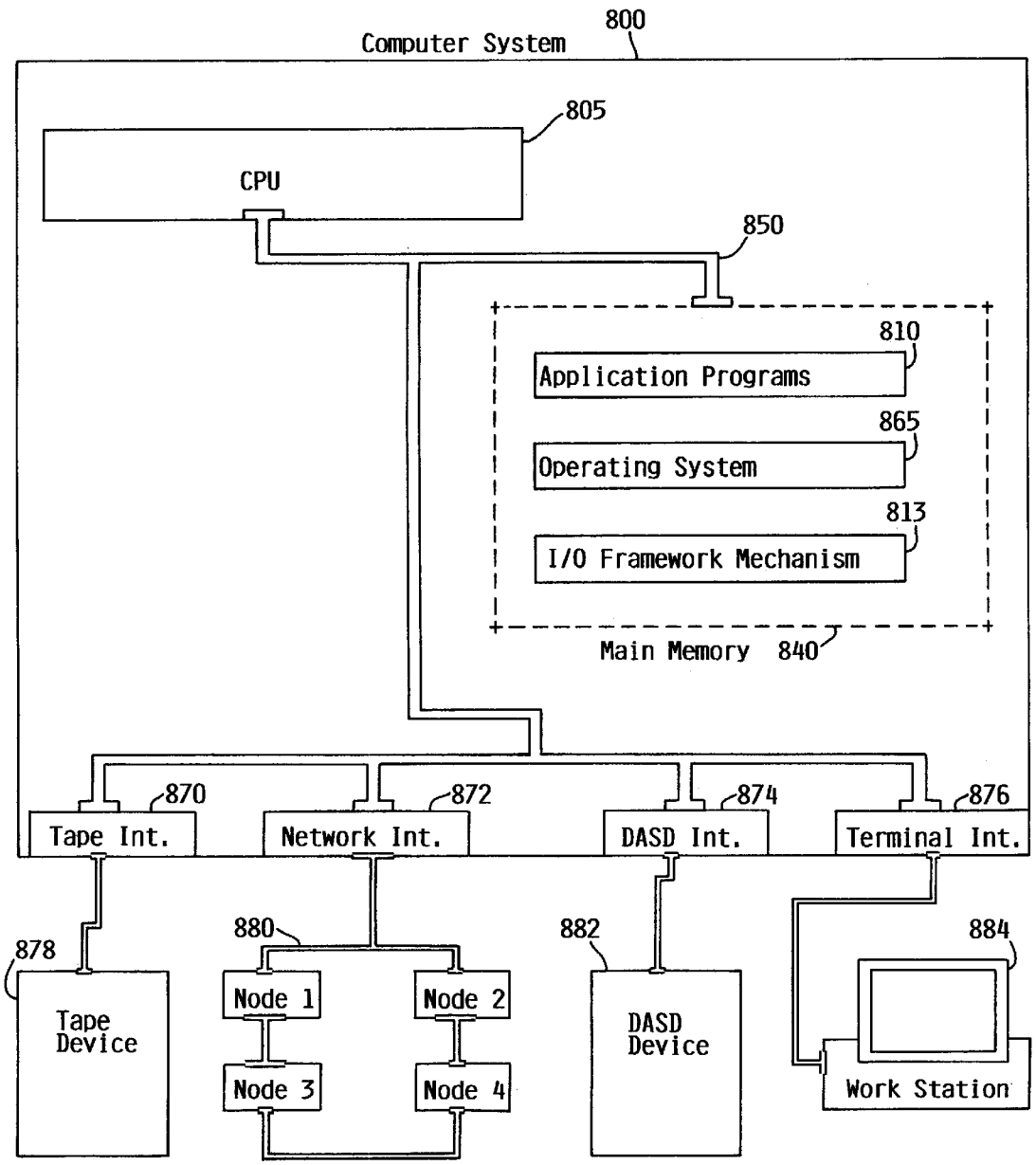
FIG. 8 is a block diagram of the computer system used in the preferred embodiment.

FIG. 8 shows a block diagram of the computer system of the present invention. The computer system of the preferred embodiment is an enhanced IBM AS/400 client-server computer system. However, any computer system could be used.

As shown in the exploded view of FIG. 8, computer system 800 comprises main or central processing unit (CPU) 805 and data storage 840, which are both connected to system bus 850. A plurality of I/O devices is also shown. Tape interface 870 is used to connect computer system 800 with tape device 878. Network interface 872 is used to connect computer system 800 with network 880. DASD interface 874 is used to connect computer system 800 with DASD device 882. Terminal interface 876 is used to connect computer system 800 to workstation 884. Each of these I/O device interfaces are also connected to bus 850. The interfaces of the preferred embodiment typically include on-board processors that are used to perform certain processing requirements and thereby reduce some of the demands upon CPU 805. These intelligent interfaces are sometimes referred to as auxiliary processors or as Input/Output processors (IOPs).

While computer system 800 is shown to include four specific I/O devices, those skilled in the art will appreciate that the present invention applies equally to any present day I/O device, regardless of type, and to any futuristic device that is used to input and/or output information to/from a computer system. Those skilled in the art will further appreciate that each I/O device interface is capable of supporting more than one I/O device. For example, DASD I/O interface 874 is capable of supporting other DASD devices in addition to DASD device 882 or even other kinds of I/O devices (eg., tape devices).

Figure 10:
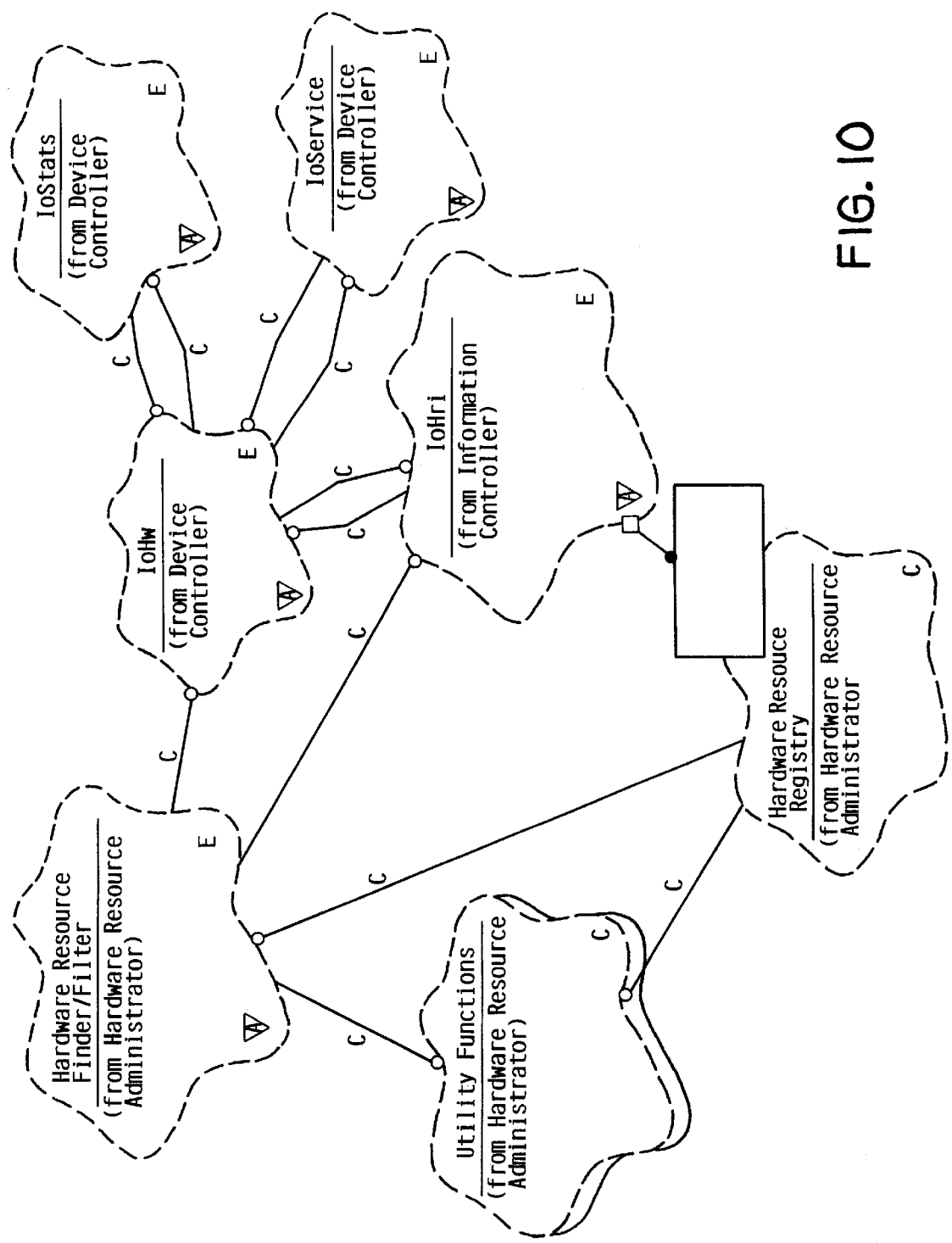
FIGS. 10, 11A, 11B, 11C, 12A, 12B, 13A, 13B, and 13C are class diagrams of a framework mechanism constructed in accordance with the teachings of the present invention.

Although the system depicted in FIG. 8 contains only a single main CPU and a single system bus, it should be understood that the present invention applies equally to computer systems having multiple main CPUs and multiple I/O buses. Similarly, FIG. 10 is a class diagram showing the high level classes of I/O framework 813. As shown on FIG. 10, there are several classes that have a uses relationship with the IoHri class. IoHri stands for I/O hardware resource information. The IoHri class is the base class for most of the objects in the information controller category. Each object represents information about one specific configured I/O device. A configured I/O device is one that is either actually present or logically present on the computer system. The IoHri object represents one half of a separation between the informational and operational characteristics of each device. This means that an IoHri object can be created for a specific device and answer queries about that device without the device actually being present on the system. The IoHri class is an extensible, abstract base class that provides several operation definitions to its subclasses. While the drawings and text show and describe a finite number of operations that each have specific names, those skilled in the art will appreciate that there are any number of different combinations of operations that could be used to supply the same functionality, and that those other combinations of operations fall well within the spirit and scope of the present invention.

There are three hardware resource administrator classes shown on FIG. 10: the hardware resource finder/filter class, the utility functions class, and the hardware resource registry class. The hardware resource finder/filter is the primary interface to the information contained in the hardware resource registry class. The hardware resource registry class contains object locations in table form, although those skilled in the art appreciate that any containment arrangement could have been used. The locations in the table are addresses of objects of type IoHri. This relationship is shown on FIG. 10 by the contains by reference notation between the hardware resource registry class and the IoHri class. The hardware resource registry class is designed to be a core function of I/O framework 813.

As shown, the hardware resource finder/filter is an abstract, extensible base class that provides its subclasses with three cursor-based table manipulation operations. The hardware resource finder/filter is designed to be extensible so that framework consumers can customize the framework to find and filter objects that represent different types of I/O devices.

The utility functions class is a class utility. Class utilities are used to define utility operations that are needed, but not directly related to any one class definition. In other words, a class utility is a way to define operations that are useful to many different types of objects, making definition for each object highly redundant. The utility functions class has a uses relationship with the hardware resource finder/filter class and with the hardware resource registry class. This is because the operations of the utilities class need to gain access to IoHri objects, and they do so via an appropriate hardware resource finder/filter object. The utility functions class has been designed to be a core function of I/O framework 813.

The IoHw class is another extensible, abstract base class definition. IoHw stands for I/O hardware. This class is the base class in a hierarchy that is used to define the objects that represent the I/O devices themselves. There is one object for each I/O device. The IoHw class has a uses relationship with the hardware resource finder/filter class and with the IoHri class because it uses an appropriate finder/filter object to locate IoHri objects and their children. The notion of children is explained in the text associated with FIG. 14A. The IoHw class also has a uses relationship with the IoStats and IoService classes. This is because IoHw objects create and activate IoStats and IoService objects. The IoHw class has been designed to be an extensible function of I/O framework 813 because the users and/or system administrators of computer system 800 are likely to want to add new I/O devices to computer system 800 and to want to remove obsolete I/O devices.

The IoStats class defines objects that collect statistical information on the hardware devices represented by IoHri objects, while the IoService class defines objects that perform diagnostic analysis on the hardware devices represented by IoHri objects. Accordingly, both classes have been designed to have a uses relationship with the IoHw class. Both the IoStats and IoService classes have been designed as extensible function of I/O framework 813 because it is likely that framework consumers will want to be able to customize the system's statistics and service functions to meet current and future needs.

Figure 11A:
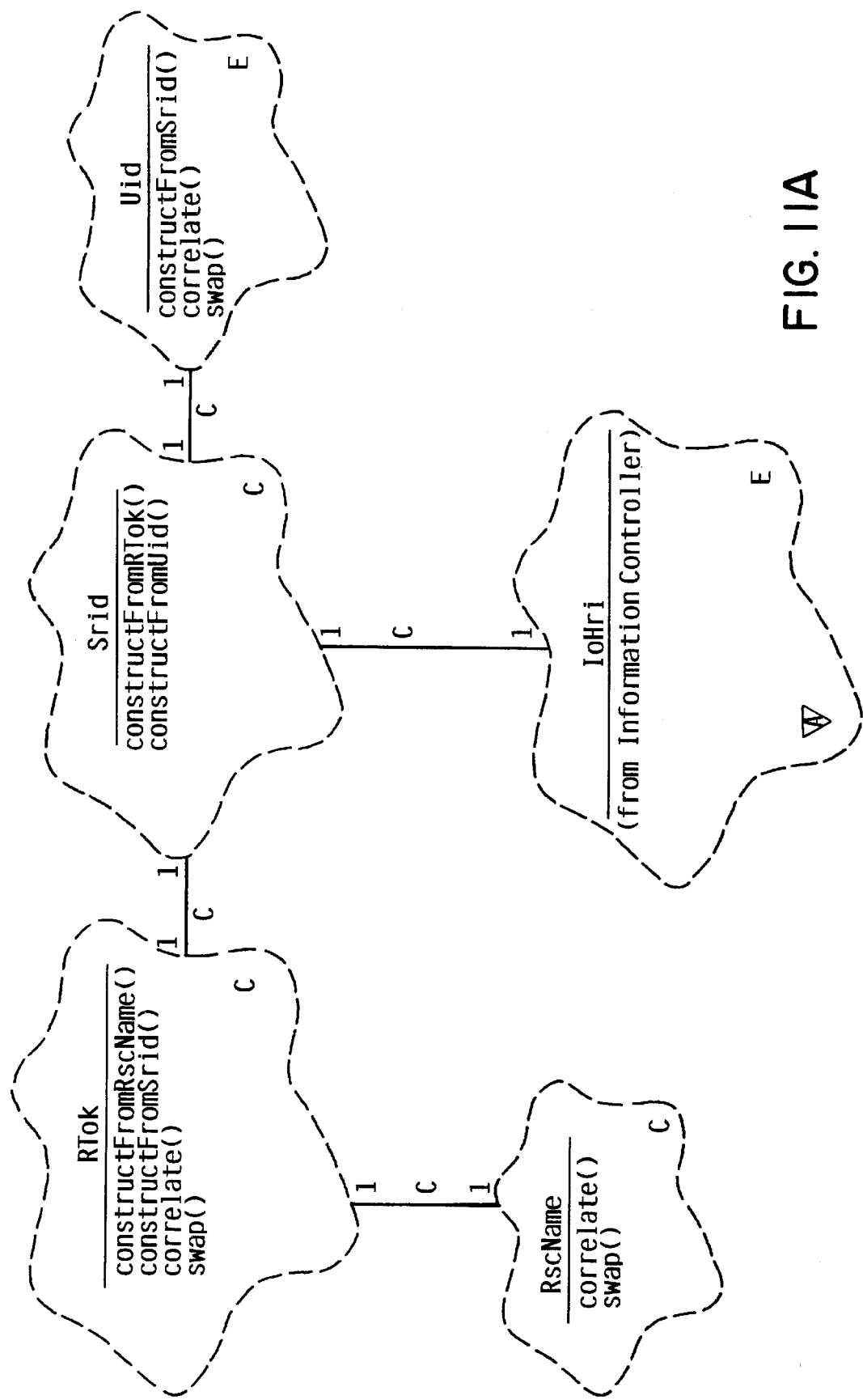

FIG. 11A shows the interrelationship of several hardware resource administrator classes and the IoHri class. When taken together, these classes define how hardware is identified by I/O framework 813. Each I/O device is uniquely identified by five objects, each of which is instantiated from one of the five classes shown on FIG. 11A. As shown, the classes have one to one association relationships between them. An association relationship is merely one that indicates that the objects of the subject classes share some type of semantic connection. In the case of I/O framework 813, individual objects of the RscName class have a one to one association with individual objects of the RTok class and the individual objects of the RTok class have one to one association relationships with the individual objects of the Srid class. The Srid objects have a one to one association relationship with the individual IoHri objects and with the individual Uid objects. Each identification class (i.e., RscName, RTok, Srid, and Uid), and the relationships between the classes, have been designed as core function of I/O framework 813.

Basically, then, there is a set of RscName, Rtok, Srid, and Uid objects that identify each I/O device. Much like people have more than one form of identification (e.g., a name, a social security number, a employee serial number, etc.), RscName, Rtok, Srid, and Uid objects are each different forms of identification for a single I/O device. The data of the RscName class definition includes the resource name of the I/O device at issue. The resource name is a system-wide unique name that is given to each I/O device by the users or system administrators of computer system 800. For example, DASD device 882 might be named DASD device #1. The resource name is used by client programs to address and/or refer to a particular I/O device. The RscName class definition provides two operation definitions for its objects: the correlate( ) operation and the swap( ) operation. The correlate( ) operation associates the specific resource name with a passed RTok (as described below, RTok means resource token). The swap operation swaps the resource names of two IoHri objects (i.e., between two I/O devices).

The data of the Rtok class contains a unique resource token that is associated with each I/O device. The resource token is a short form of the resource name that is used for the internal processing of I/O framework 813. The RTok class definition includes definitions for four operations: the constructFromSrid( ) operation, the constructFromRscName operation, the correlate( ) operation, and the swap( ) operation. The swap( ) and correlate( ) operations perform functions identical to those performed by the swap( ) and correlate( ) operations of the RscName class definition, except that the swap operation relates to resource tokens instead of resource names and that the correlate operation creates an association between an RTok and an Srid instead of between a resource name and an RTok. The constructFromSrid( ) operation creates an Rtok based on a provided Srid, while the constructFromRscName( ) operation creates an Rtok based on a provided resource name. In other words, these constructor operations instantiate an Rtok object based on a resource name or system resource Id that is passed by a calling client program.

The data of the Uid class contains a unique system-wide universal identifier that is associated with each I/O device. The Uid is an identifier that is automatically given to each I/O device by I/O framework 813 whenever a user or a system administrator adds a new I/O device to computer system 800. The Uid class definition includes definitions for three operations: the constructFromSrid( ) operation, the correlate( ) operation, and the swap( ) operation. The swap( ) and correlate( ) operations perform functions identical to those performed by the swap( ) and correlate( ) operations of the RscName and RTok class definitions, except that the swap( ) operation relates to universal Ids instead of resource names or resource tokens and that the correlate( ) operation creates the association between a Uid and an Srid instead of between a resource name and an RTok or between a RTok and a Srid. The constructFromSrid( ) operation creates a Uid object based on a provided Srid. In other words, this constructor operation instantiates a Uid object based on an Srid that is passed by a calling client program.

The data of the Srid class contains a unique system resource Id that is associated with each I/O device. The system resource token is a short form of the universal identifier that is used for the internal processing of I/O framework 813. The Srid class definition includes two operation definitions, the constructFromRTok( ) operation and the constructFromUid( ) operation. The constructFromRTok( ) operation creates an Srid object based on a provided RTok, while the constructFromUid( ) operation creates an Srid based on a provided universal identifier. In other words, these constructor operations instantiate an Srid object based on a resource token or universal Id that is passed by a calling client program. The association relationship between the Srid class and the IoHri appears in FIG. 11A because the table of the hardware resource registry class is essentially a map between Srids and IoHri objects.

Generally speaking, the RscName (and RTOK as its short form) represent the device identificator that is meaningful to the users and system administrators; whereas, the Uid (and Srid as its short form) represent the device identification that is meaningful to I/O framework 813. By using two different identification mechanisms and a link back and forth, the present invention allows users and system administrators to change RscNames without requiring a corollary change to I/O framework mechanism 813.

Figure 11B:
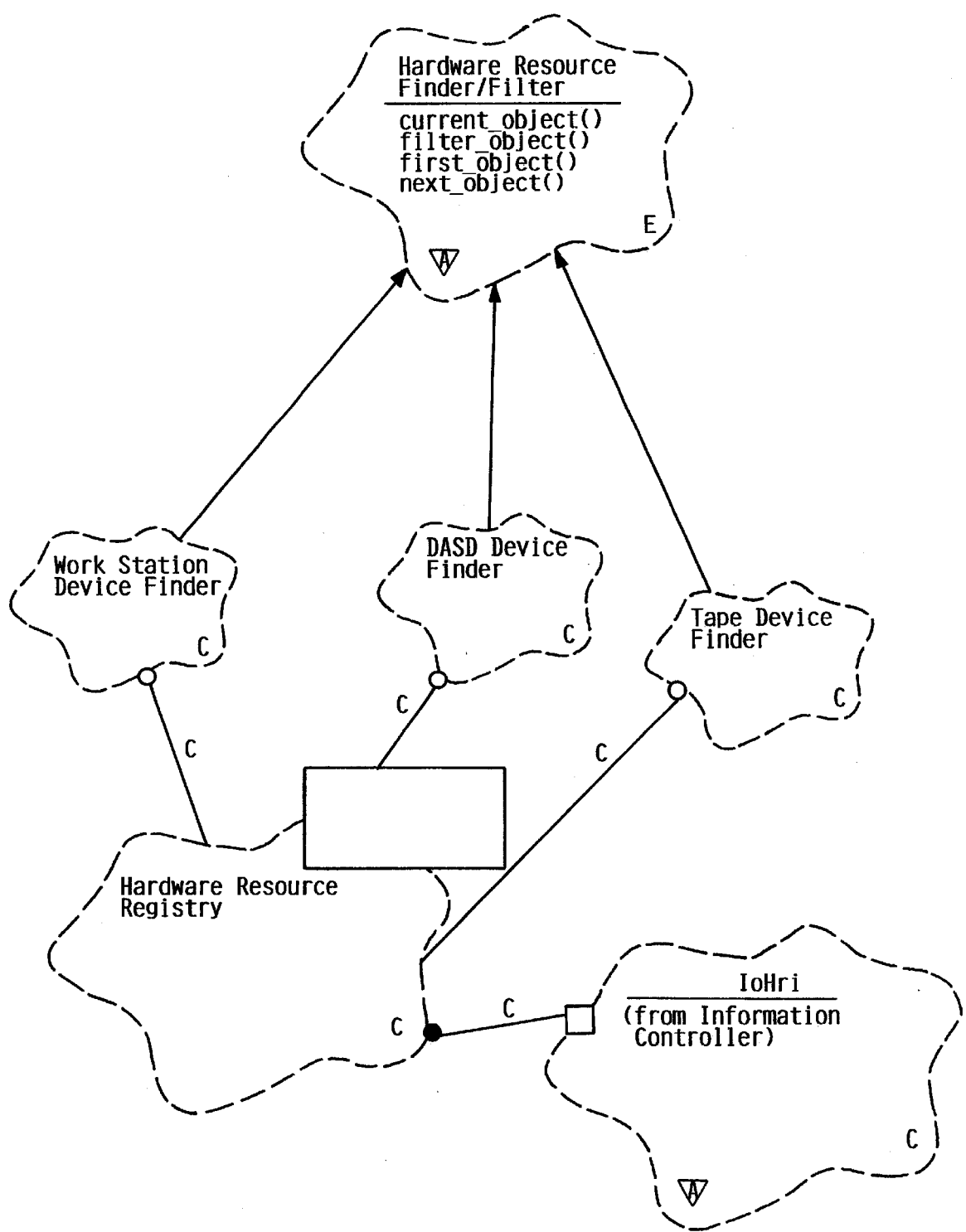

FIG. 11B shows example subclasses of the hardware resource finder/filter class and how those classes interrelate with the hardware resource registry and IoHri classes. As previously described, the hardware resource finder/filter is an abstract, extensible base class that defines three cursor-based table manipulation operations and a filter operation. The generic table manipulation operations are: the current_object( ) operation, which is defined to return the object that is currently being addressed by the cursor to the calling object; the next_object( ) operation, which is defined to move the cursor ahead to the next object in the table and to return that object to the calling object; the first_object( ) operation, which is defined to move the cursor to the first object in the table; and the filter_object( ) operation, which is defined to represent consumer defined filtering operations. The example subclasses are the workstation device finder, the DASD device finder, and the tape device finder. As discussed, the hardware resource registry is a table of pointers to IoHri objects. Therefore, the example subclass implementations of each of the table manipulation operation definitions are designed such that they find IoHri objects of a particular type (e.g., DASD devices in the case of the DASD device finder class). However, those skilled in the art will appreciate that the present invention is not limited to finder/filters that operate exclusively based on type. (Objects that are members of the hardware resource finder/filter class are called finder/filter objects for claim purposes).

Figure 11C:
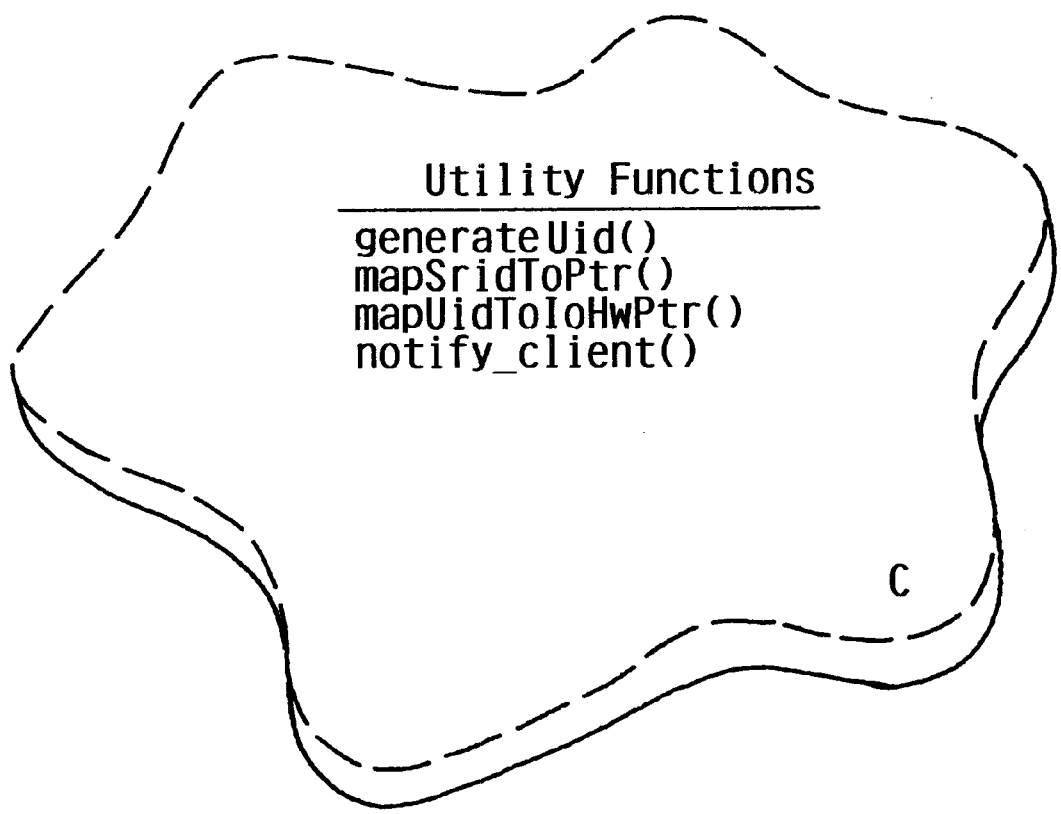

FIG. 11C shows the utility functions class in more detail. The utility functions class is the last class of the hardware resource administrator category. As previously mentioned, classes like the utility functions class are class utilities that are used to define utility operations that are needed, but not directly related to any one class definition. As shown, the utility functions class of I/O framework 813 has definitions for four operations, the generateUid( ) operation, the mapUidToIoPtr( ) operation, the notify_client( ) operation and the mapSridToPtr( ) operation. The generateUid( ) operation is used to generate a universal Id for an I/O device. Universal Ids are explained in the text associated with FIG. 11A. The mapUidToIoPtr( ) operation is used to attempt to associate a generated Uid with an existing IoHri object. The operation returns the object when the association can be made and an error message when the association cannot be made. The notify_client( ) operation is used by client programs (i.e., those of application programs 810 in the case of computer system 800) when the client programs want to be notified when devices matching certain descriptions are "powered-on." For example, client programs may use this operation to automatically bring-up a workstation to computer connection every time a users powers-on a workstation. The mapSridToPtr( ) operation is used by client programs that wish to obtain an IoHri object for a particular device from any given Srid.

FIG. 12A is a class diagram shows that the inheritance hierarchy of the information controller category in more detail. As previously described, the IoHri class is the base class for most of the objects in the information controller category. Each object represents information about one specific configured I/O device. The IoHri class is an extensible, abstract base class that provides ten operation definitions to its subclasses. The operations are: the constructFromPersistentRec( ) operation, which is defined to be used to create an IoHri object from persistent information; the enrollChild( ) operation, which is defined to be used to inform parent devices of the existence of a child device (see the text associated with FIG. 14A); the enrollParent( ) operation, which is defined to be used to inform child devices of the existence of a parent device (e.g., a device controller); the enrollVPD( ) operation, which is defined to by used to update an IoHri object with vital product data; the get Modelo operation, which is defined to return the particular model of a particular I/O device; the getRscName( ) operation, which is defined to return the resource name for any given IoHri object; the getRTok( ) operation, which is defined to return the resource name of any given IoHri object; the getSerial( ) operation, which is defined to retrieve the serial number from I/O devices that support this capability; and the setRscName( ) operation, which is defined to interact with the client program to name an I/O device when a device is added by a user or system administrator.

The IoHriCNFG and IoHriLogical classes are subclasses of the IoHri class. The IoHriLogical subclass is an abstract extensible class that provides four operation definitions to its subclasses. The operation definitions are: the getHW/Status operation, which is defined to obtain the status of the associated I/O device (e.g., operational, disconnected, failed, etc.) and return the status to the requesting client program; the getIoHwPtr( ) operation, which is defined to return the pointer to the associated IoHw object; the getKind( ) operation, which is defined to ascertain the type of the particular device (i.e., tape, DASD, etc.) and return the type to the requesting client program; and the updatePersistentRecord( ) operation, which is defined to save the persistent data associated with the I/O device into persistent storage (i.e., usually DASD device 882).

The IoHriCNFG subclass is an abstract extensible class that provides two operation definitions to its subclasses. The operations are: the getKind( ) operation, which is defined to return the kind of physical configuration to a requesting client program (e.g., a card or a tower) and the getPhysicalAddr( ) operation, which is defined to return the physical address to a requesting client program.

The IoHriDevTape and IoHriDevDasd classes are subclasses of the IoHriLogical class, which (as shown) is itself a subclass of the IoHri base class. The IoHriDevTape and IoHriDevDasd classes are examples of subclasses that can be created for different types of devices. Those skilled in the art will appreciate that the present invention is not limited to any particular type of I/O device.

As their names suggest, the IoHriDevTape class is for magnetic tape devices such as tape device 828 and the IoHriDevDasd class is for magnetic disk devices such as DASD device 882. Classes of this sort will have operations that are specifically designed to support the particular type of device at issue. For example, the IoHriDevTape class has a compactionInDevice( ) operation, which ascertains whether the device has compaction capability and a streamingMode( ) operation, which ascertains whether the device has streaming capability. Both of these operations are only applicable to tape devices, which is why they appear in the lowest level subclass instead of in a superclass where they would be available for use with devices that were not tape devices.

The IoHriCnfgTower and IoHriCnfgCard classes are subclasses of the IoHriCnfg class. These subclasses are examples of subclasses that can be created to represent different kinds of physical configurations. Those skilled in the art will appreciate that the present invention is not limited to any particular kind of physical configuration.

Figure 12B:
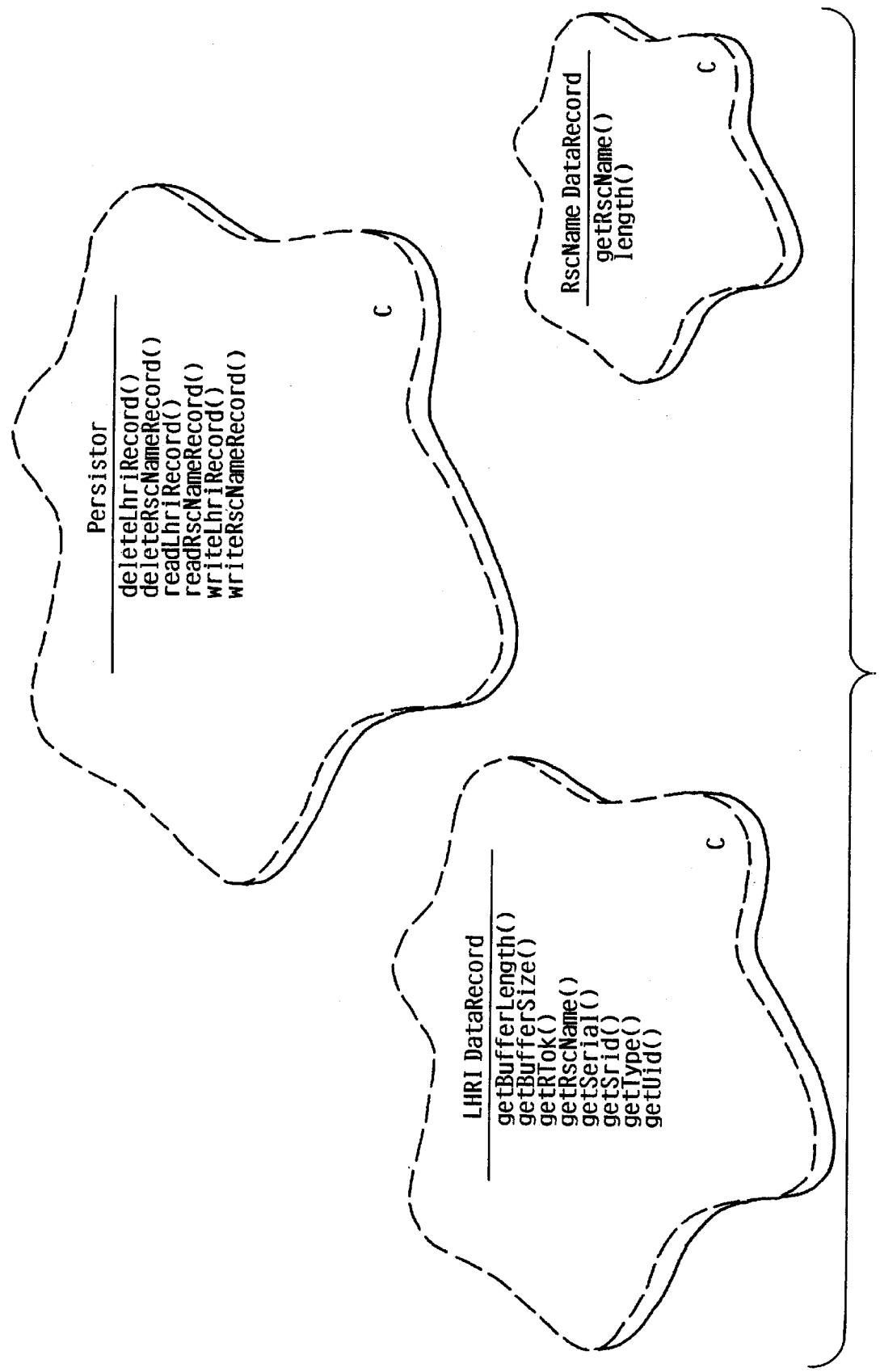

FIG. 12B shows three utility classes that are used to provide persistence for the objects of I/O framework 813. The operations of the persistor utility class are used to manage data records that represent IoHri and resource name information. As such the class utility provides operations that read, write, and delete such records. The LHRI DataRecord class utility provides operations that pack the data record with LHRI information (eg., model, serial number, Rsc Name, and Srid) and retrieve LHRI information from the data record, while the RscName DataRecord utility class provides operations that pack and retrieve only the RscName from the data record. This is because the user can create a resource name without having to immediately associate that name with a specific device.

Figures 1, 13A:
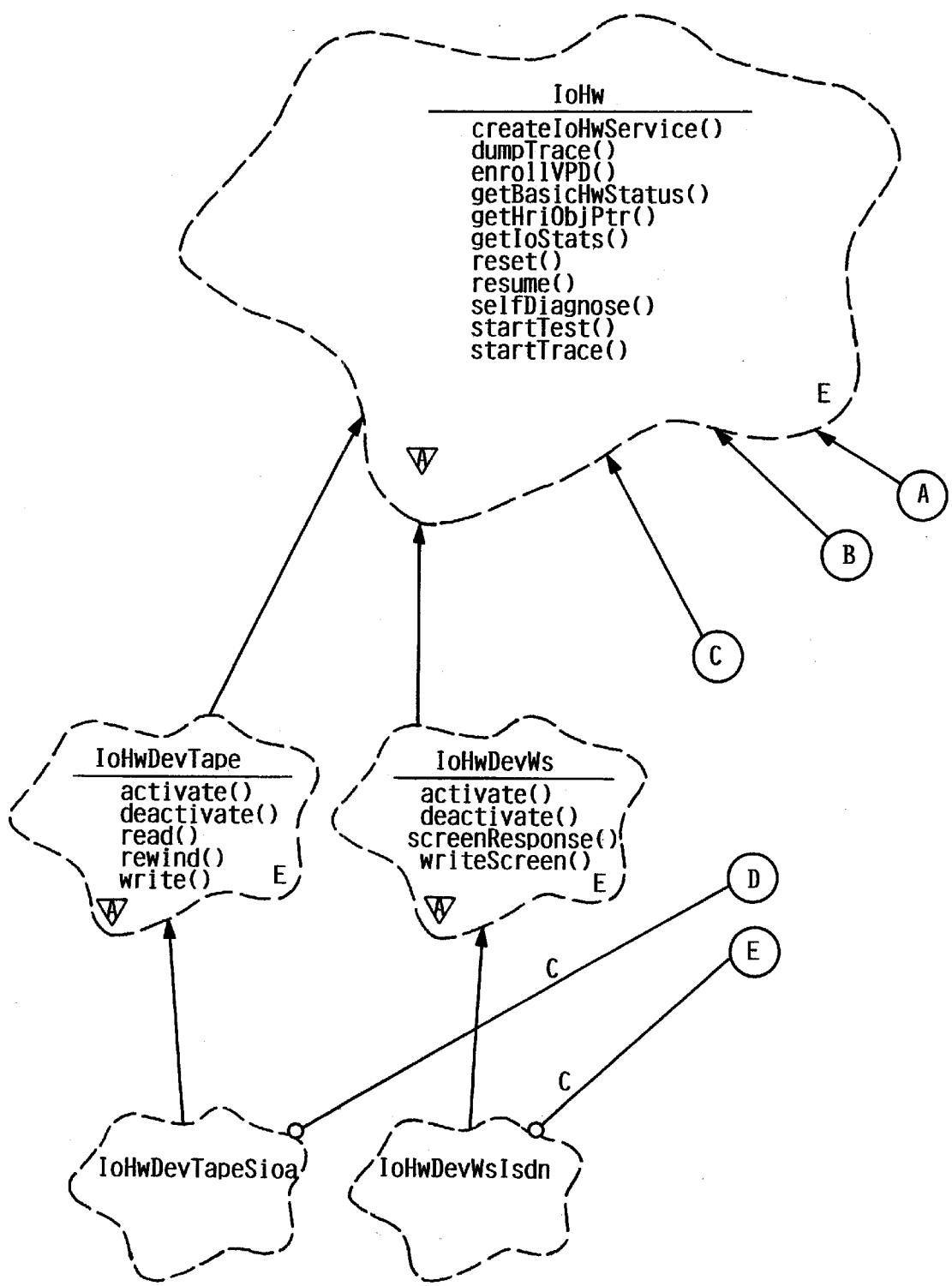
Figures 2, 13A:
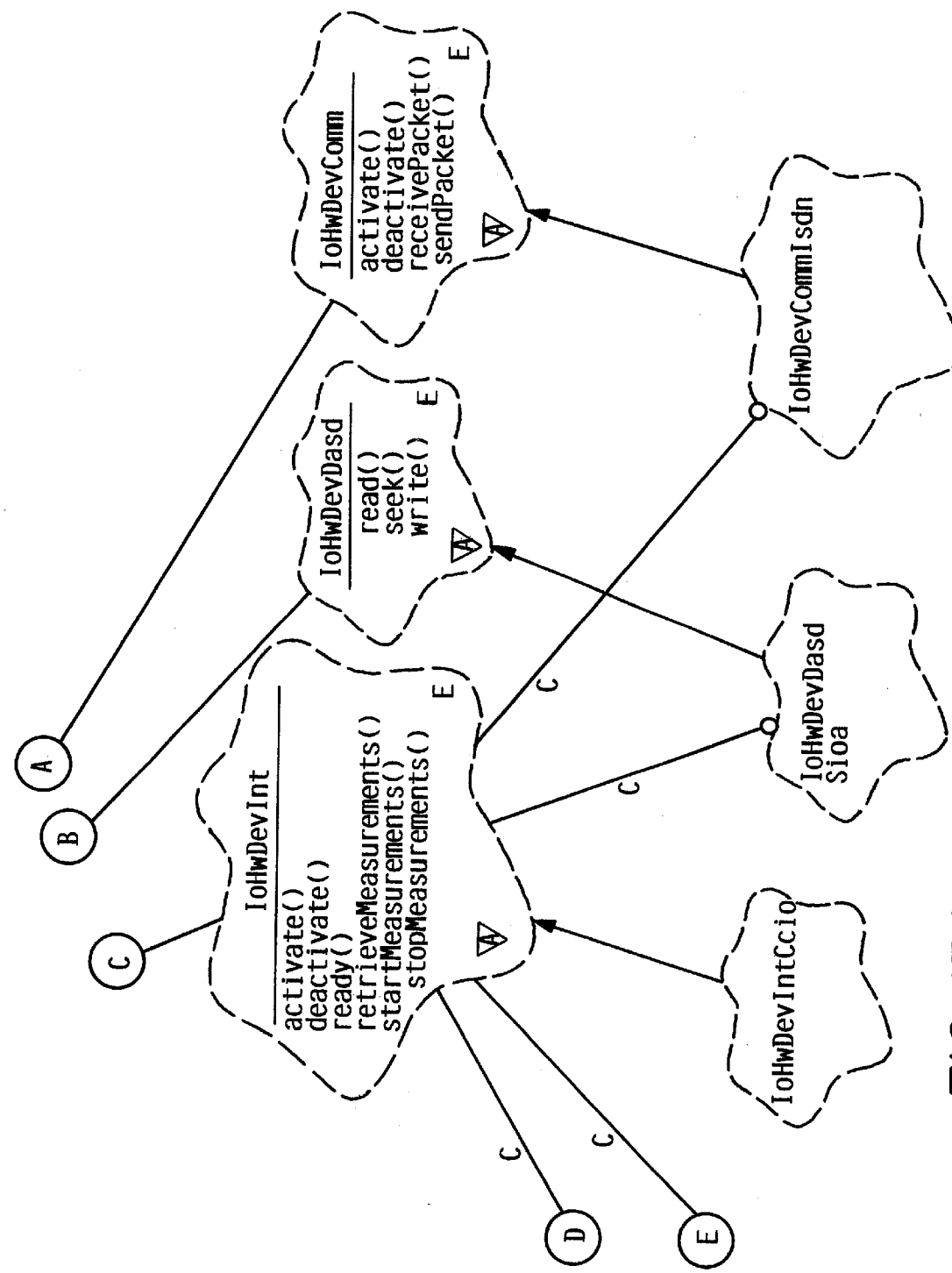

FIG. 13A shows the classes and relationships that represent the operational aspects of the device controller. As previously described, the base class in this hierarchy is the IoHw class. IoHw stands for I/O hardware. This base class provides eleven operation definitions to its subclasses: the createIoHwService( ) operation, which is defined to set the I/O device into service mode and to return a service object; the dumpTrace( ) operation, which is defined to be used to request that an I/O device return previously collected trace data, the getBasicHwStatus operation, which is defined to determine if the I/O device is operational (e.g., disconnected etc.); the getHriObjPtr( ) operation, which is defined to return a pointer to the Hri object associated with the I/O device; the getIoStats operation, which is defined to start statistics gathering for a particular I/O device; the reset( ) operation, which is defined to cause the device to undergo a soft restart; the resume( ) operation, which is defined to cause an I/O device to resume normal operation after it had been requested to enter self diagnosis mode; the selfDiagnose( ) operation, which is defined to be used to instruct an I/O device to enter self diagnosis mode; and the startTest( ) and startTrace( ) operations, which are respectively defined to be used to request that the subject I/O device begin self test and to request that the device begin collecting trace data.

The subclasses of the IoHw class are the IoHwDevTape, IoHwDevWs, the IoHwDevDasd, IoHwDevInt, and IoHwDevComm classes. IoHwDevTape, which stands for I/O hardware device tape, is the class that is used for all the different types of tape devices. This class is an abstract extensible class that provides five operation definitions to its subclasses. The activate( ) and deactivate( ) operations are respectively defined to prepare an I/O device for use and to free an I/O device so that it can be used (i.e., so that it can be activated via the activate operation). The read( ) and write( ) operation definitions are respectively defined to read and write information from and to the magnetic tape on a tape device (e.g., tape device 878). The rewind( ) operation is defined to cause the tape device to rewind its tape.

IoHwDevWs, which stands for I/O hardware device workstation, is the class that is used for all the different types of workstations. This class is an abstract extensible class that provides four operation definitions to its subclasses. The activated( ) and deactivated operations are defined to be used to activate and deactivate workstations. The write Screen( ) operation is defined to send a "screens worth" of data to a workstation while the screen Response( ) operation is defined to be used to receive information from a workstation.

IoHwDevDasd, which stands for I/O hardware device DASD, is the class that is used for all the different types of DASD devices. The class is an abstract extensible class that provides three operation definitions to its subclasses. The seeko operation is defined to move the read/write head of the magnetic disk storage device to a specified sector, while the read( ) and write( ) operations are respectively defined to read and write information from and to a magnetic disk device (e.g., DASD device 882).

IoHwDevComm, which stands for I/O hardware device communications, is the class that is used for all the different types of communications. This class is an abstract extensible class that provides four operation definitions to its subclasses. The activate( ) and deactivate( ) operations are respectively defined to activate and deactivate a network. The send Packet( ) operation is defined to be used to send data to a network, while the receive Packet( ) operation is defined to be used to receive data from a network.

IoHwDevInt, which stands for I/O hardware device interface, is the class that is used for all the different types of interface devices (e.g., tape interface 870, network interface 872, and DASD interface 874). The class is an abstract extensible class that provides five operation definitions to its subclasses. The activate( ) and deactivate( ) operations are respectively defined to prepare a device attached to the interface device for use and to free a device attached to the interface device so that it can be used (i.e., so that it can be activated via the activate operation). The startMeasurements( ) and stopMeasurements( ) operations are respectively defined to start the collection of statistical data for a device attached to the interface device and to stop the collection of statistical data on the interface device. The retrievemeasurements( ) operation is defined to retrieve the statistical information and the ready( ) operation is used by other IoHw objects to alert interface IoHw objects of their ready status.

The next level of classes are specific subclass implementations of the interfaces defined in their respective abstract classes. For example, the IoHwDevTapeSioa class is a subclass of the IoHwDevTape class that has specific SIOA (System Input/Output Architecture) implementations of the five operations that are defined in the IoHwDevTape class. Similarly, the IoHwDevWsIsdn class is a subclass of the IoHwDevWs class that has specific ISDN (Integrated System Digital Network) implementations of the four operations that are defined in the IoHwDevWs class. Notice also that all of the I/O device subclasses (e.g., IoHwDevTapeSioa and IoHwDevWsISDN) have a uses relationship with the IoHwDevInt class. This uses relationship represents the actual relationship between an I/O device and the computer system's interface for the I/O device (e.g., the relationship between tape device 878 and tape interface 870).

Figure 13B:
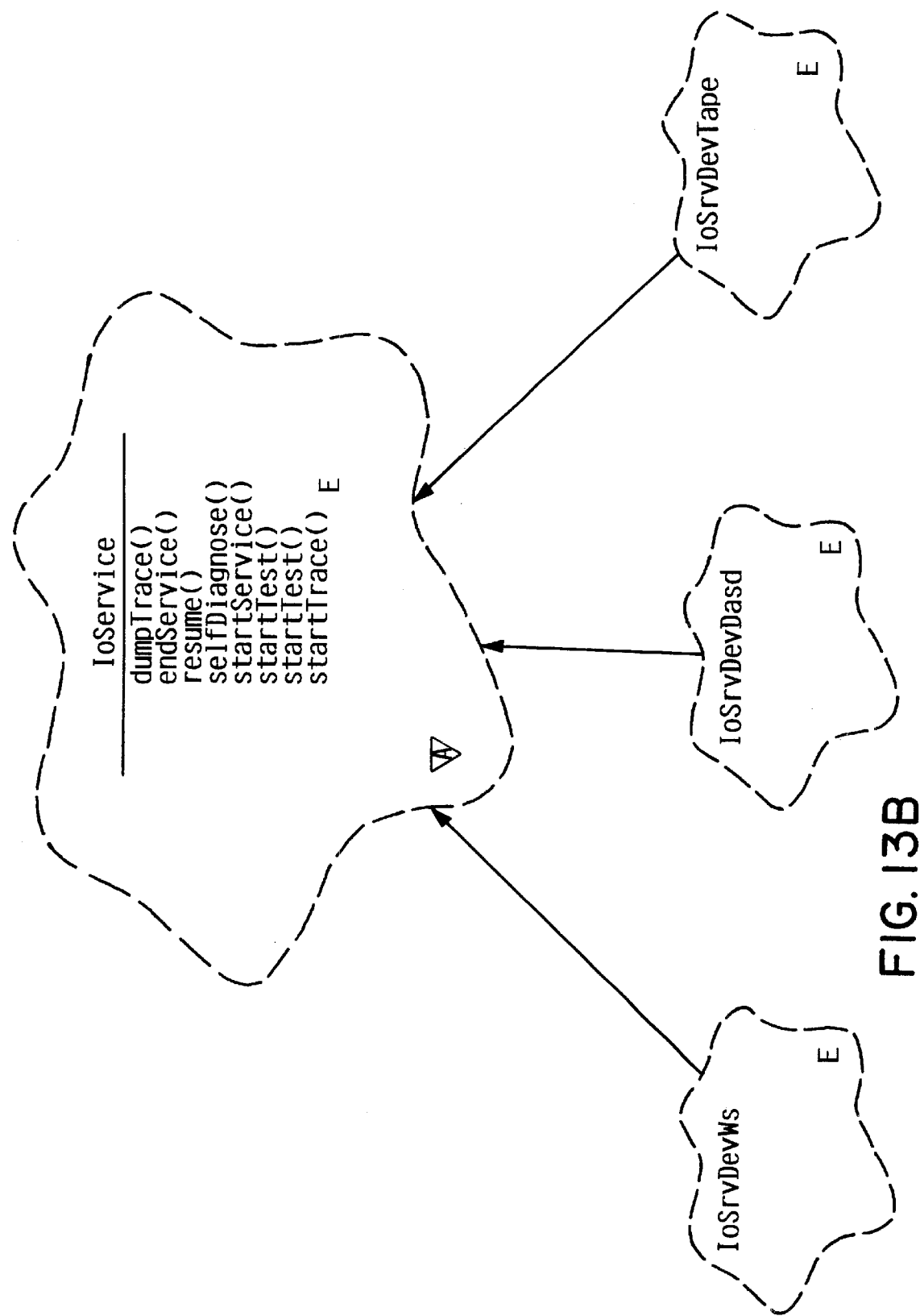

FIG. 13B shows the IoService abstract class. The IoService class, which is another device controller class, defines five operations that can be used by its subclasses. The definitions are for the endService( ), selfDiagnose( ), startService( ), and startTest( ) operations. As their names suggest, the startService( ) and endService( ) operations are to be used to commence and terminate service for an I/O device. The selfDiagnose( ) operation is to be used to instruct the device to begin a self-test. The startTest( ) operation is to be used to start a specific test routine on the I/O device.

The loSrvDevWs, loSrvDevTape, and the IoSrvDevDasd subclasses are example implementations for the endService( ), selfDiagnose( ), startService( ), and startTest( ) operations definitions contained in the IoService base class. Each of these subclasses further define the operations in light a specific type of device. For example the IoSrvDevTape subclass contains implementations of the endService( ), selfDiagnose( ), startService( ), and startTest( ) that are particular to Tape devices.

Figure 13C:
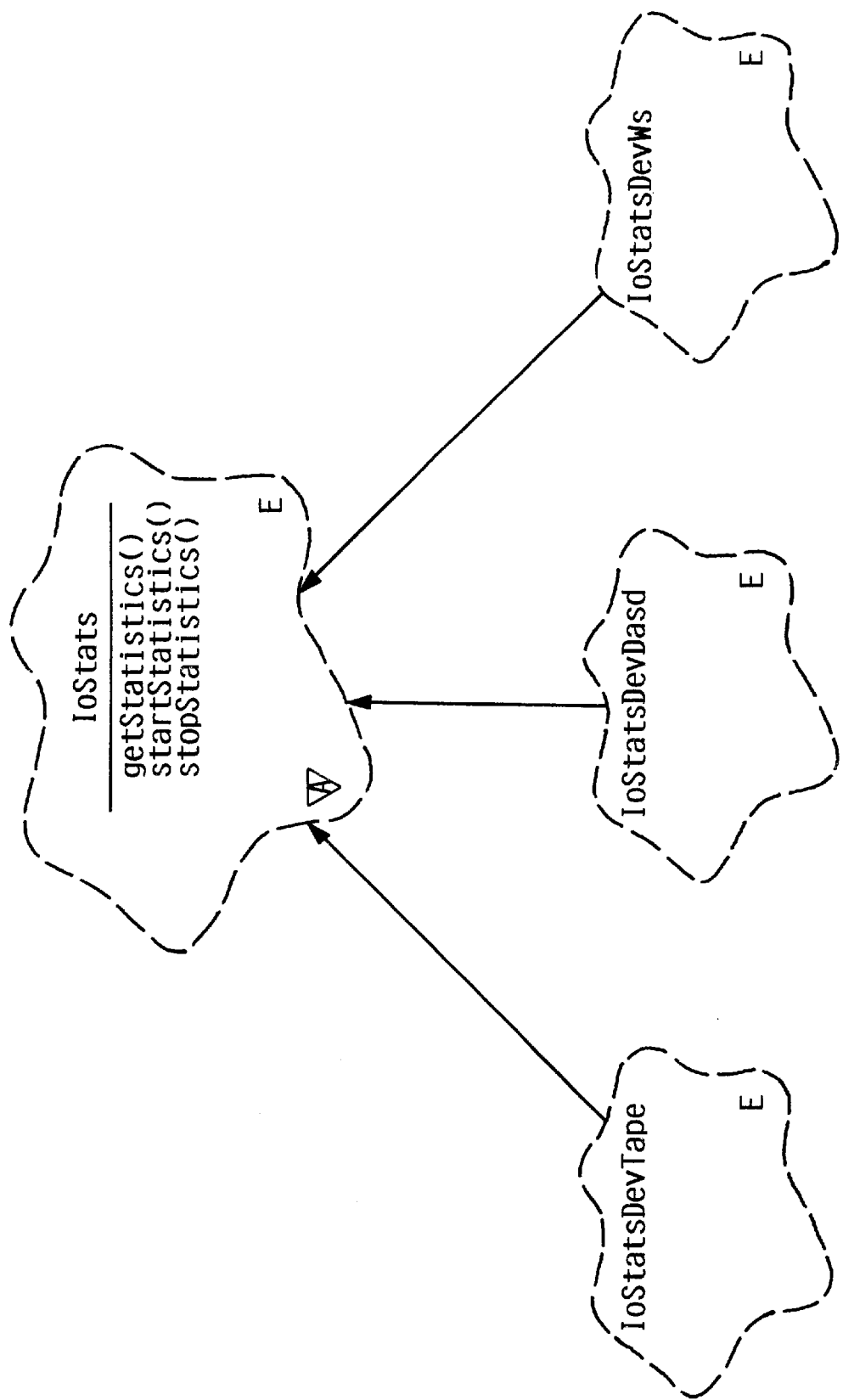

FIG. 13C shows the IoStats abstract class. The IoStats class, which is still another device controller class, defines three operations that can be used by its subclasses. The interface definitions are for the startStatistics( ), stopStatistics, and getStatistics( ) operations. As their names suggest, the startStatistics( ) and stopStatistics( ) operations are to be used to commence and terminate the collection of statistics for an I/O device. The getStatistics( ) operation is to be used to gather collected statistics.

The IoStatsDevTape, IoStatsDevDasd, and the IoStatsDevWs subclasses are example implementations for the operations definitions contained in the IoStats base class. Each of these subclasses further define the operations in light a specific type of device. For example the IoStatsDevDasd subclass contains implementations of the startStatistics( ), stopStatistics, and getStatistics( ) operations that are particular to DASD devices.

Object Interaction

Figures 1, 14A:
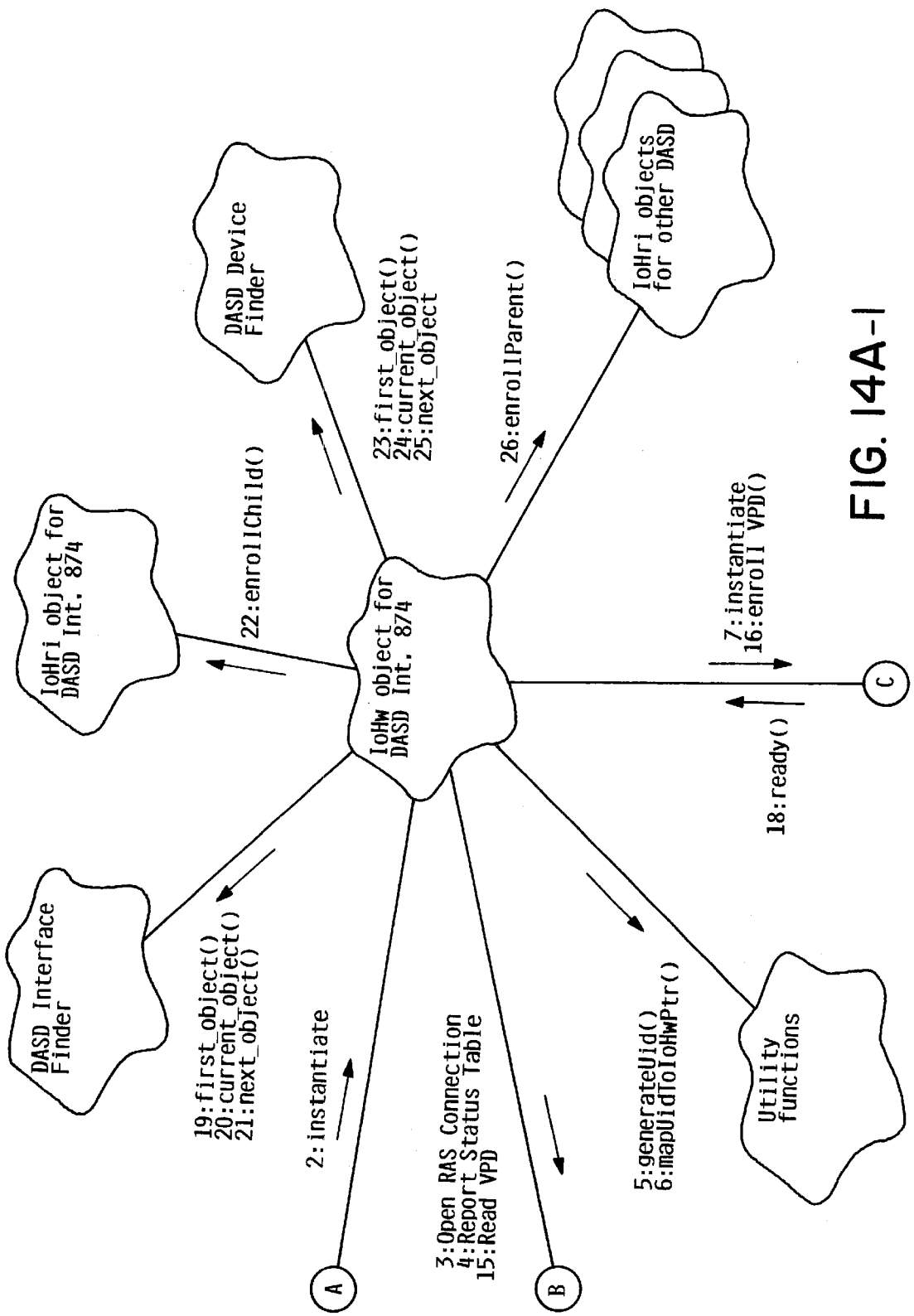
FIGS. 14A, 14B, and 14C are object diagrams of a framework mechanism constructed in accordance with the teachings of the present invention.
Figures 2, 14A:
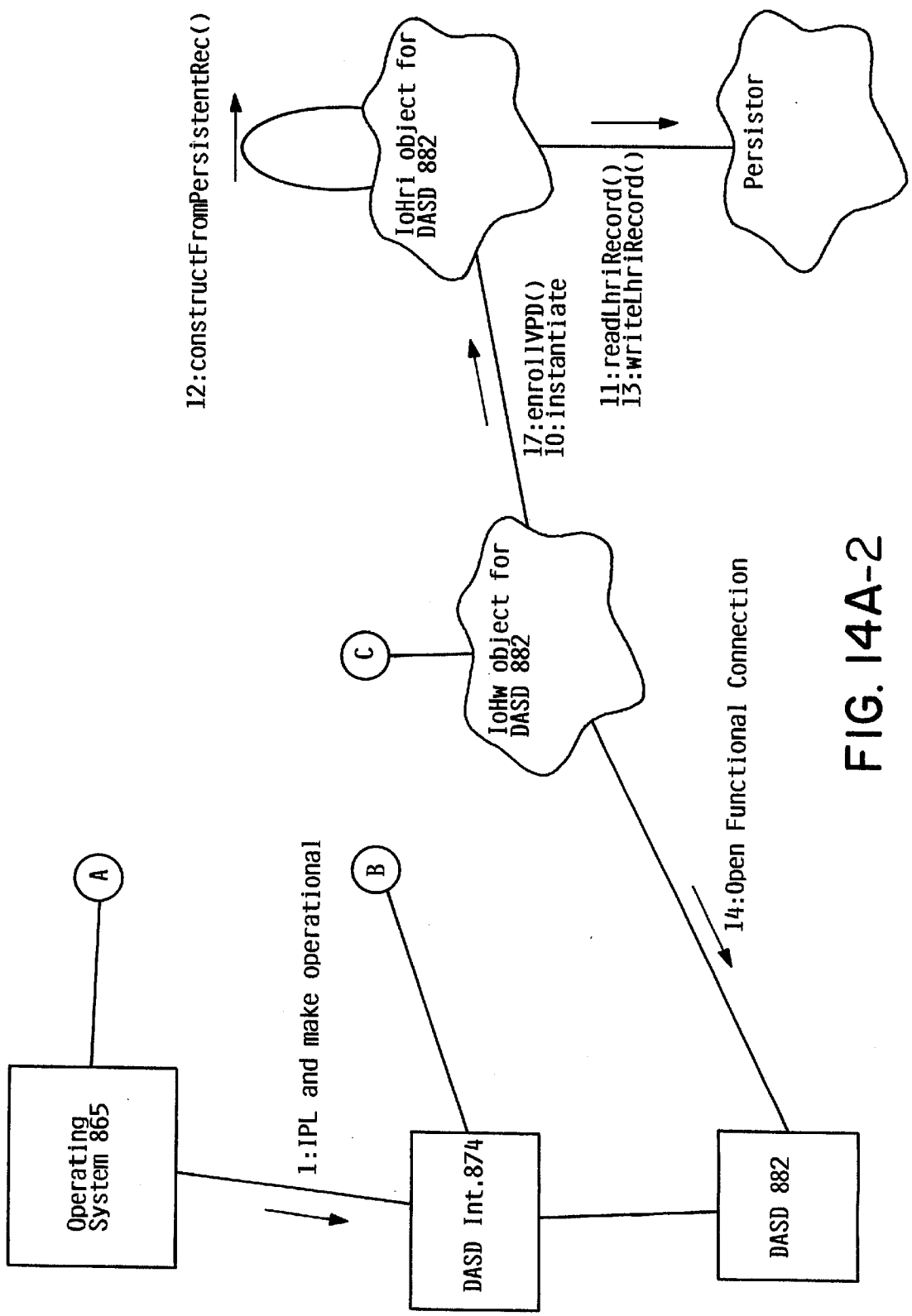

FIG. 14A is an object diagram that shows an example object interaction that takes place within I/O framework 813 when computer system 800 is "powered-on." For the purposes of explanation, only the initialization of DASD device 882 is shown. However, those skilled in the art will understand that other object interactions occur for other types of I/O devices. The interaction is initiated when operating system 865 initializes DASD interface 874 [step 1]. Next, operating system 865 instantiates an IoHw object for DASD device 882 [step 2]. (Hw objects are defined in the class hierarchy shown on FIG. 13A.) It should be understood that step 2 and the series of steps that follow take place for every I/O interface. For the purposes of explanation, the steps are described once with respect to I/O interface 874. Instantiation occurs through a call from operating system 865 to a constructor( ) operation. Since constructor operations are well known to those skilled in the art of OO design, specifics about constructor operations are not shown or described.

Once the IoHw object (called hardware objects for claim purposes) for DASD interface 874 has been instantiated, this object opens a management connection to DASD interface 874 [step 3]. The particular way in which device to device (e.g., computer system 800 to DASD interface 874) logical connections are established is not important to the present invention. Therefore, details regarding these connections are not set forth herein. The IoHw object next interrogates DASD interface 874 to determine the type and number of I/O devices that are attached to DASD interface 874 [step 4]. With the knowledge of what I/O devices are attached to DASD interface 874, the IoHw object for DASD interface 874 proceeds to generate a Uid [step 5] and attempt to map that Uid to an IoHwPtr [step 6]. An IoHwPtr is a pointer to a IoHw object for the subject I/O device. It should be understood that step 6 and the steps that follow are repeated for each I/O device connected to the subject I/O interface. For the purposes of explanation, the steps will be described once with respect to DASD device 882. If the IoHw object for DASD interface 874 is unable to map the Uid to a particular IoHw object, the IoHw object for DASD interface 874 proceeds to instantiate an IoHw object for each device (only the IoHw object for DASD device 882 is shown) [step 7].

This accomplished, the IoHw object instantiates an IoHri object (called information objects for claim purposed) for DASD device 882 [step 8]. IoHri objects are defined in the class hierarchy of FIG. 12A. If DASD device 882 is previously unknown to computer system 800 (i.e., this is the first time that computer system 800 has been power-on with DASD device 882 connected), the instantiate step (i.e., step 8) will amount to the creation of an IoHri object comprising default configuration data (e.g., Rtok, RscName, etc.). If, on the other hand, DASD device 882 is a previously configured DASD device (i.e., one that was previously connected to computer system 800), the IoHri object for DASD device 882 is created from existing persistent data [alternative shown by steps 10, 11, and 12].

Once the IoHri object has been created (through whichever means), the IoHw object for DASD device 882 opens a functional connection to DASD device 882 [step 13]. This completed, the IoHw object for DASD device 882 returns control to the IoHw object for DASD interface 874. This IoHw object then reads the vital product data (VPD) from DASD interface 874. The VPD generally includes all of the important information about all of the devices that are attached to a device interface. For example, DASD interfaces may well have capacity information about all of their connected DASD devices. Once collected, the VPD for the specific device is sent to all of IoHw objects for all of the devices that are attached to the device interface at issue (i.e., DASD device interface 874 in this case) [step 14]. The IoHw objects then relay the information to the respective IoHri objects [step 15]. Once steps 1–15 have been processed, DASD device 882 is ready to be used and the IoHw object for DASD device 882 so notifies the IoHw object for DASD interface 874 [step 16]. At this point, I/O framework mechanism 813 will attempt to notify other devices about the presence of DASD 882. More specifically, I/O framework 813 will attempt to notify all the devices of computer system 800 that can be said to have "parent" or "child" relationship with DASD device 882. In our example, DASD device 882 has no real parent or children. If, however, DASD device 882 were a DASD controller instead of a simple DASD device, it would be necessary to notify all of the DASD controller's children (i.e., the connected DASD devices) of the presence of the DASD controller. Similarly, if DASD device 882 were connected to a DASD controller that was itself connected to DASD interface 874, it would be necessary to notify the parent of DASD device 882 (i.e., the DASD controller) of the presence of DASD device 882. Steps 21 through 26 of FIG. 14A show this functionality.

Figures 1, 14B:
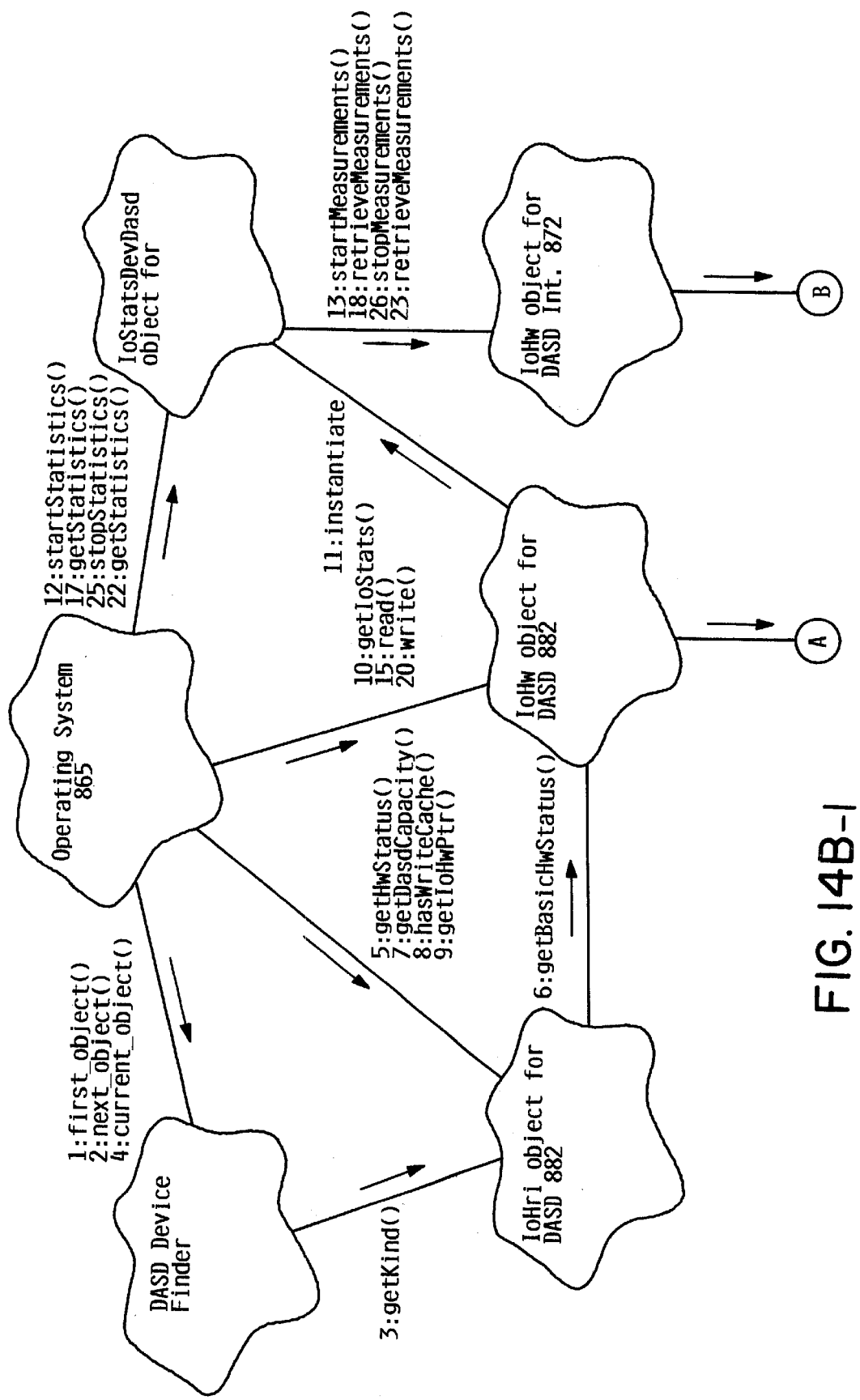
Figures 2, 14B:
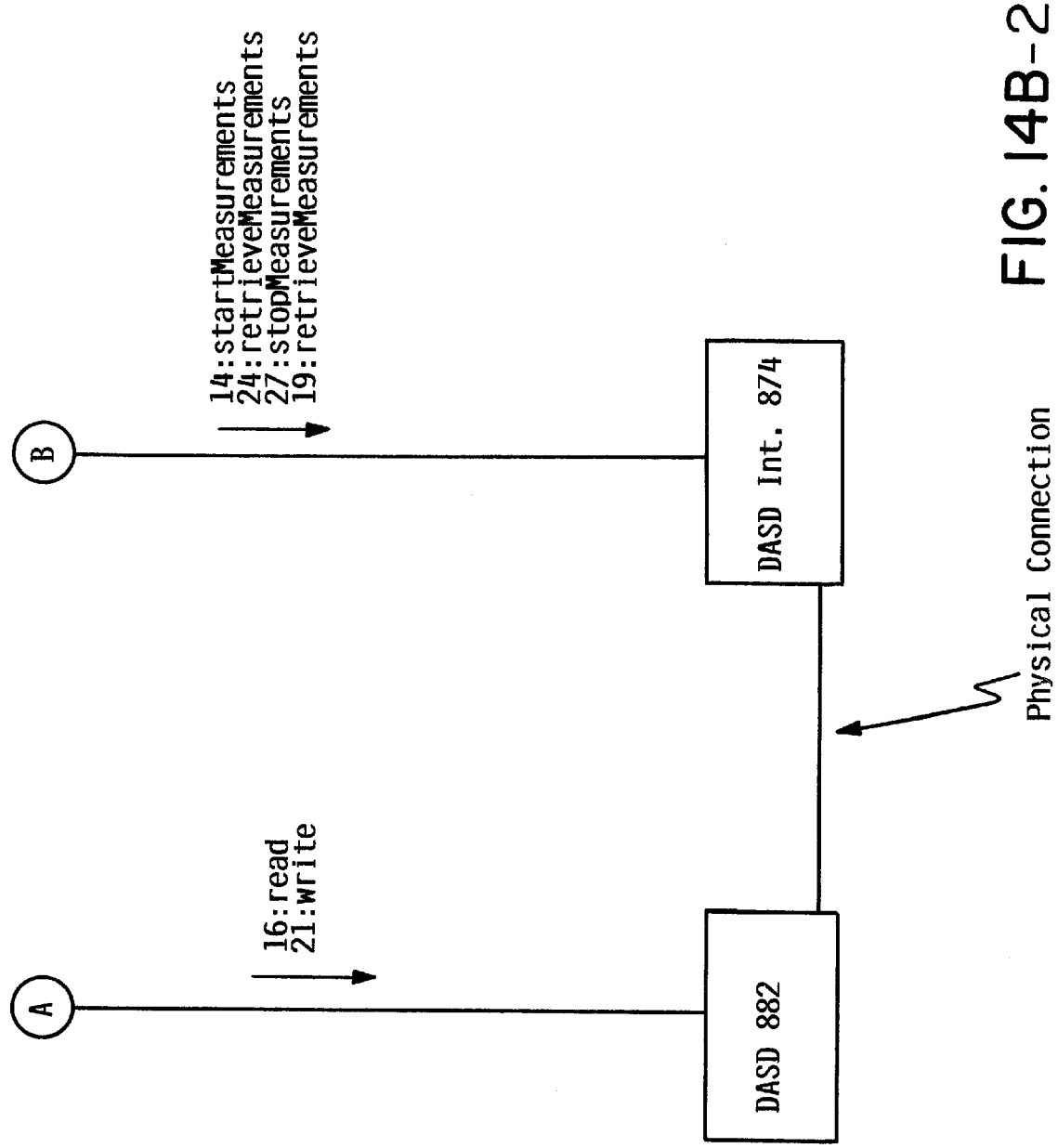

FIG. 14B is an object interaction diagram that shows an example of how operating system 865 would interact with DASD device 882 after the device had been initialized (i.e., after the processing shown on FIG. 14A had completed). Again, it should be understood that this is only one example interaction and that there are many other interaction scenarios that fall within the spirit and scope of the present invention. Operating system 865 first locates the IoHri object for DASD device 882 by interacting with a DASD device finder [steps 1, 2, 3, and 4]. The class definitions for device finders are found on FIG. 11B. Once operating system 865 has located the correct IoHri object, operating system 865 checks on the operational status of DASD device 882 via a call to the getHwStatus( ) operation of the IoHri object for DASD 882. The IoHri object responds to this request by invoking the getBasicHwStatus( ) operation of the IoHw object for DASD 882. The IoHw object returns the status to the IoHri object, which ultimately returns the status to operating system 865. For the purposes of explanation, assume that the status of DASD 882 is operational.

After learning that DASD device 882 is operational, operating system 865 determines the capacity of DASD device 882 [step 7], whether DASD device 882 has a write cache [step 8] and the location of the IoHw object that is associated with DASD device 882 [step 9]. Operating system 865 then informs the IoHw object that statistics gathering is desired for DASD 882 by calling the getIoStats( ) operation on the IoHw object for DASD 882 [step 10]. This causes the IoHw object for DASD device 882 to instantiate an I/O Stats object (ic, a statistics object called IoStatsDevDasd in this case) for DASD 882 [step 11]. Once this object has been instantiated, operating system 865 begins statistics gathering by invoking the startStatistics( ) operation of the newly instantiated IoStatsDevDasd object [step 12]. This causes the IoStatsDevDasd object to start statistics collection on DASD 882 [steps 13 and 14].

Once statistics gathering has commenced, operating system 865 begins a read operation by invoking the read( ) of IoHw object for DASD 882 [step 15]. This causes the IoHw object to initiate a read on DASD 882 [step 16]. After the read operation has been performed, operating system 865 retrieves the statistics [steps 17, 18 and 19]. Operating system 865 then initiates a write operation [steps 20 and 21] and gets the statistics that result from that operation [steps 22, 23, and 24]. After performing the operations and retrieving the statistics, operating system 865 stops the statistics [steps 25, 26, and 27].

Figures 1, 14C:
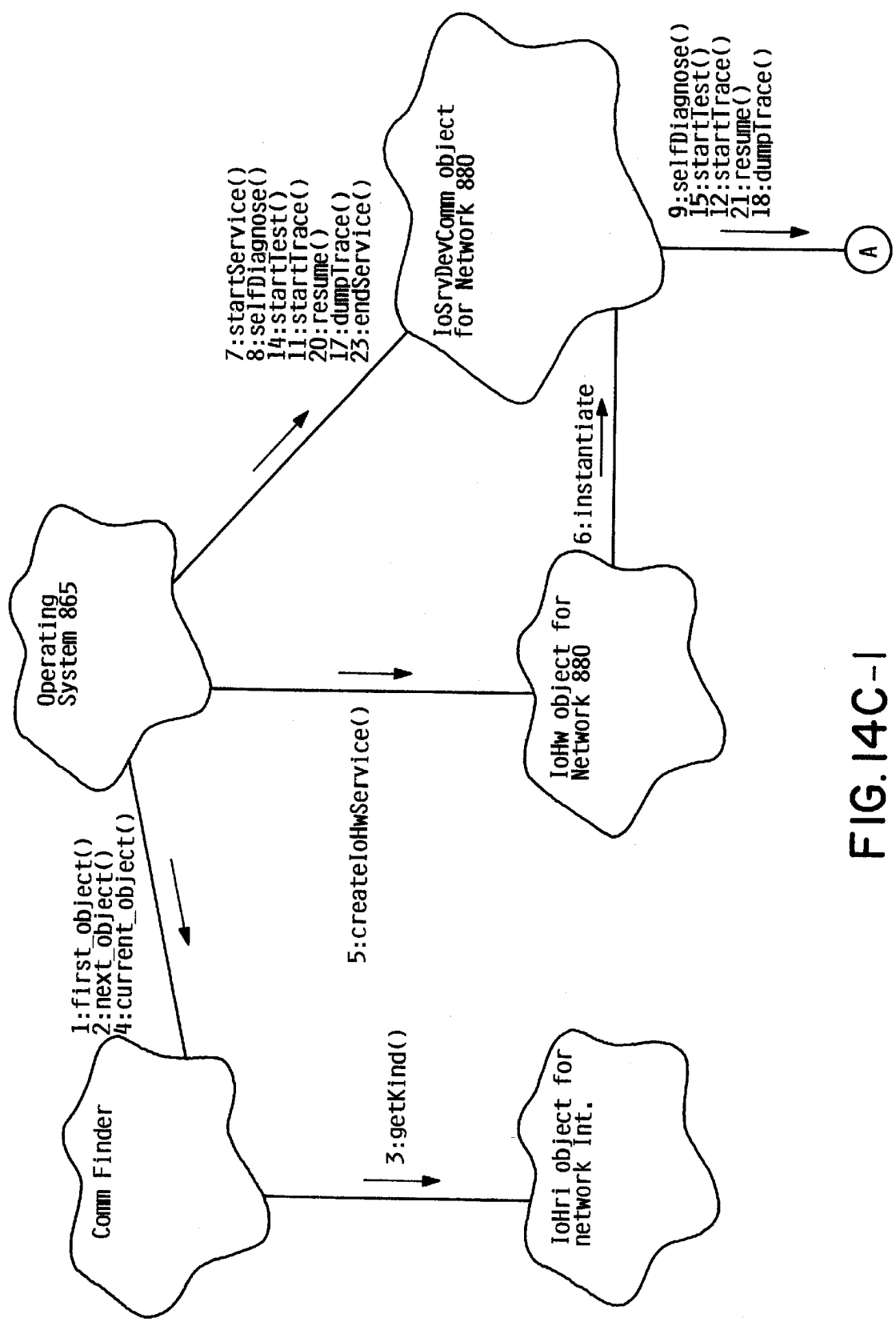
Figures 2, 14C:
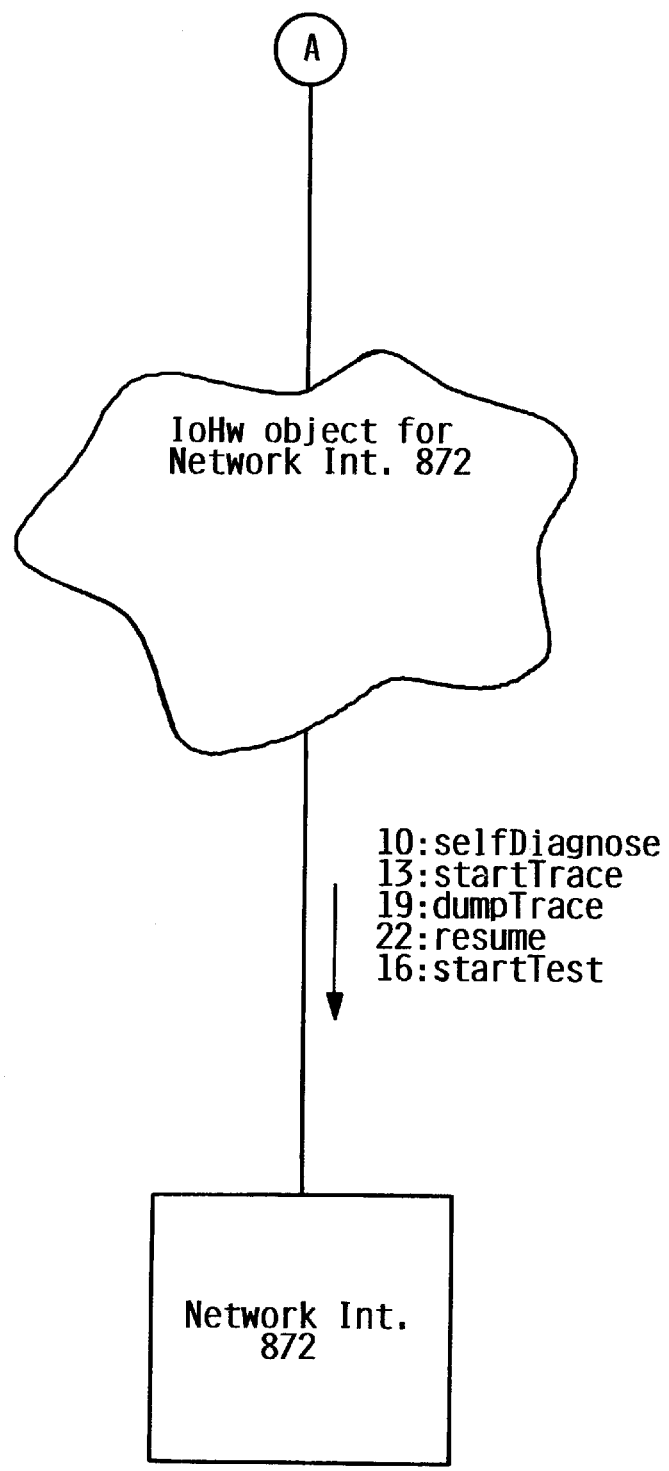

FIG. 14C is an object interaction diagram that shows an example service scenario. Initially, operating system 865 locates the IoHw object for network 880 [steps 1, 2, 3, and 4]. Operating system 865 then initiates service of network 880 by calling the createIoHwService operation of the IoHw object for network 880 [step 5]. The IoHw object for network 880 responds by instantiating an I/O Service object (ie, IoSrvDevComm in this case) for network 880 (i.e., by putting the device into service mode) [step 6]. Once the IoSrvDevComm object has been created, operating system 865 starts service [step 7] and self diagnosis [step 8]. The self diagnosis step causes the IoSrvDevComm object to, in turn, request that the IoHw object for network interface 872 start self diagnosis on network interface 872 [steps 9 and 10].

Operating system 865 also starts a trace [step 11], the request for which is likewise passed on to network interface 872 [steps 15 and 16]. The trace is then dumped [steps 17, 18, and 19]. Normal operation is then resumed by subsequent calls to the resume( ) operations [steps 20, 21, and 22]. After the resumption of normal operation, operating system 865 terminates service (i.e., takes the device out of service mode) [step 23].

The embodiments and examples set forth herein were presented in order to best explain the present invention and its practical application and to thereby enable those skilled in the art to make and use the invention. However, those skilled in the art will recognize that the foregoing description and examples have been presented for the purposes of illustration and example only. The description as set forth is not intended to be exhaustive or to limit the invention to the precise form disclosed. Many modifications and variations are possible in light of the above teaching without departing from the spirit and scope of the forthcoming claims.

Notation

There is, as yet, no uniformly accepted notation for communicating object-oriented programming ideas. The notation used in this specification is very similar to that known in the programming industry as Booch notation, after Grady Booch. Mr. Booch is the author of *Object-Oriented Analysis and Design With Applications,* 2nd ed. (1994), available from The Benjamin/Cummings Publishing Company, Inc. Use of Booch notation concepts within this specification should not be taken to imply any connection between the inventors and/or the assignee of this patent application and Mr. Booch or Mr. Booch's employer. The notational system used by Mr. Booch is more fully explained at Chapter 5, pp. 171–228 of the aforementioned book. The notational system used herein will be explained generally below. Other notational conventions used herein will be explained as needed.

A system that is modeled by an object-oriented framework can be represented at a high level of abstraction by a diagram called a top-level class diagram. FIG. 1 of the drawings is an example of a top-level class diagram containing boxes that represent abstractions of the modeled system. the boxes are arranged in a hierarchy such that boxes representing abstractions close to the physical components of the system are at the lower levels of the diagram and boxes representing more abstract, functional components are closer to the top of the diagram. In FIG. 1, the boxes are labelled as "mechanisms" to denote that the abstractions comprise means for implementing modeled system components. The boxes (mechanisms) can be thought of as categories comprising groups of similar classes defined according to object-oriented programming concepts. FIG. 1 represents a zoo administration model and therefore the lower hierarchy boxes include a box called Animal Mechanism, which represents animals within the zoo model, and a box called Containment Unit Mechanism, which represents animal pens and cages. At the highest level of FIG. 1, the box called Zoo Administration represents a functional abstraction that encompasses a variety of administrative tasks that are performed by personal.

The boxes in a top-level class diagram represent the system abstractions that provide the system behavior. The system abstractions include classes and objects. Details of the system classes are provided in a class diagram that is used to show the class categories and to indicate the relationships and responsibilities of the classes. A class is represented by an irregularly shaped, dashed-line icon commonly referred to a cloud. FIG. 2, for example, shows several classes represented as clouds. Each class is identified by a name that is unique to the associated class category and also indicates the relationship of each class to one of the mechanisms illustrated in FIG. 1. Within a class icon, the class name is listed above attribute names, operation names followed by parentheses, and constraints that are enclosed within brackets. FIG. 3 illustrates the class Zoo Administrator in greater detail. FIG. 3 indicates that the Zoo Administrator class includes multiple operations, including ones called "5_minute_timer( )", "add_animal( )", and "add_containment_unit( )". Words in the operation names (and class attribute names) are separated by an underscore for easier reading. An example of a class attribute listing is shown by the attributes called "feed_freq" and "temp_range" in the class Animals illustrated in FIG. 5.

Connecting lines between mechanisms (FIG. 1) and classes (FIG. 2) indicate the nature of the relationships between such respective abstractions. Thus, connections between the boxes in FIG. 1 represent relationships between the various mechanisms. A straight connecting line, for example, represents a simple association relationship indicating shared information. A "using" relationship is a refinement of a simple association whereby one abstraction that is referred to as a server or supplier provides services to another abstraction that is referred to as a client. Such a relationship is indicated by an open circle at one end of a simple association line, the open circle end designating the client that "uses" the associated server.

Another refinement of a simple association between two classes is a type referred to as an inheritance relationship. Inheritance is a relationship among classes in which one class shares the structure and/or behavior associated with one or more other classes. An inheritance association is also referred to as a "is a" relationship. Thus, given two classes A and B, the class A has an inheritance relationship with the class B if A is an example of a B; A is said to be a subclass of B and B is said to be a superclass or parent of A. That is, A "is a" B. An inheritance relationship is denoted with a connecting line that includes an arrowhead at one end to indicate a subclass that derives its characteristics from a parent class at the other end of the line.

Another refinement of class relationships is called an aggregation relationship, which denotes an association between a whole and its parts or attribute classes. In notation, an aggregation relationship is indicated between a whole class and an attribute class connected with an association line by a solid circle at the whole class end, with an attribute class at the other end.

Another relationship specified by a class diagram is an instantiation relationship. An instantiation relationship represents an instance of a class such as a particular implementation of a class as supported by a programming language. For example, a class called "animal" can have multiple instantiations comprising lions, tigers, and bears. An instantiation of a class is represented by a dashed association line with an arrowhead pointing from an instance of a class to the general class.

Finally, a class relationship referred to as a metaclass denotes a relationship in which a class itself is treated as an object that can be manipulated. That is, a metaclass is a class whose instances are themselves classes. Some computer languages, such as Small Talk, support the concept of a metaclass. Such relationships are denoted by a shaded line with an arrowhead pointing from an instance of a metaclass to the general metaclass.

Classes can be parameterized, which denotes a family of classes whose structure and behavior are defined independently of its formal class parameters. A parameterized class is represented by a cloud-shaped class icon with a rectangular box placed over a portion of the cloud. The parameter list is named within the rectangular box. An instantiated class includes a parameter box, called an adornment, in contrast to a dashed line box for a general class. The instantiation relationship between a parameterized class and its instantiated class is represented as a dashed line pointing to the parameterized class. Typically, an instantiated class requires a "using" relationship to another concrete class for use as an actual parameter.

Properties of classes can be represented by class adornments that are enclosed within the class cloud icon. In particular, an abstract class is denoted by an upper case block "A" within a triangle that is placed within a cloud. An abstract class is a class for which no instances may be created. That is, it is a class of classes. Other class adornments are functions of the OO implementation language. For example, the C++ language permits special class qualifications that will be given special adornments. A static class is represented by an upper case block "S" within an adornment triangle, a friend class is denoted by an upper case block "F" within an adornment triangle, and a virtual class is represented by an upper case block "V" within an adornment triangle.

In addition to defining classes, a designer of an object oriented programming system must define objects (see page 136 of Booch). Objects are represented as solid line clouds within which is placed the object name located above a list of object attributes. An object is a tangible entity that exhibits a well defined behavior. An object is intended to represent some part of a real system that is being represented by the object oriented program. An object is characterized by a state, a behavior, and an identity. An object can be thought of as an instance of a class. The behavior of an object is an indication of how the object acts and reacts in terms of its state changes and its message-passing actions.

Objects and their interrelationships are represented in object diagrams that comprise object icons having links that indicate synchronization between objects. Links are sequentially numbered to indicate the flow of operations. The existence of a link between two objects indicates an association between their corresponding classes and denotes a path of communication between them. Thus, a link between two objects indicates that one object may send messages to another. The direction of message transfer is indicated by adorning a simple connecting line with an arrowhead that points from an object that invokes an operation, referred to as the client, to the object that provides the operation, referred to as the supplier. Such a representation of a simple synchronization relationship denotes the simplest form of message-passing. Such an association can indicate, for example, the invocation of an operation. Operation parameters can be indicated adjacent the linking line.

Some objects may be active, meaning that they embody their own thread of control. That is, such objects are not simply sequential. Active objects may have a variety of concurrency characteristics. If an object has multiple threads of control, then synchronization must be specified. Message synchronization can be synchronous, meaning that the client will wait until the supplier accepts the message. Synchronous synchronization is indicated with an "X" with an arrowhead. Synchronization can encompass balking message-passing, meaning that the client will abandon the message if the supplier cannot immediately service the message. Balking is indicated with an arrowhead turned back on itself. Synchronization can encompass a time-out synchronization, meaning that the client will abandon the message if the supplier cannot service the message within a specified amount of time. Time-out synchronization is indicated with a clock face representation adjacent a linking arrowhead. Finally, synchronization can encompass an asynchronous message, meaning that the client sends an event to a supplier for processing, the supplier queues the message, and the client then proceeds without waiting for the supplier. Those. skilled in the art will appreciate that asynchronous message synchronization is analogous to interrupt handling. Asynchronous message synchronization is indicated with a half arrowhead.

It bears mention that the Booch notation includes interaction diagrams that trace the execution of objects and classes. Interaction diagrams are essentially restructured object diagrams. That is, interaction diagrams do not convey any additional information from that conveyed by object diagrams, but simply present the same information in a different format. The present specification makes use of object diagrams rather than interaction diagrams, but those skilled in the art will recognize that they are equivalent and also will understand how to convert from one to the other without further explanation.

In FIG. 7, for example, the object called Zelda 706 obtains a list of current zoo keepers by calling an operation called List Zoo Keepers from the object called Zoo Keeper Register. The second processing step is represented in FIG. 7 by the Zoo Keeper Register object responding to the operation call by passing a message to the Zelda object that comprises the zoo keeper list. The zoo keeper objects include members of the Zoo Keepers class called Tina, Vince, and Fred. The third step indicated in the object diagram is for the object Zelda to pass a message to each of the zoo keepers instructing them to check the animals by calling the respective Check Animals operation of each zoo keeper object.

What is claimed is:

1. A computer system, said computer system comprising:
  a bus;
  a central processing unit;
  main memory connected to said central processing unit via said bus;
  at least one I/O device;
  at least one application program, said application program residing in said main memory for execution on said central processing unit, said application program using facilities provided by said I/O device; and
  an I/O framework mechanism, said I/O framework mechanism residing in said main memory for execution on said central processing unit, said I/O framework mechanism being used to manage and control said I/O device, said I/O framework mechanism further comprising core function and extensible function, said core function being designed such that said core function is not to be subject to modification by a consumer of said framework mechanism, said extensible function being designed such that said extensible function can be customized and extended by said consumer.

2. The computer system of claim 1 wherein said core function comprises a hardware resource administrator and first portions of a device controller and first portions of an information controller and wherein said extensible function comprises second portions of said device controller and second portions of said information controller.

3. The computer system of claim 2 wherein said resource administrator is further comprised of:

at least one container object, said container object being used to contain at least one information object, said information object being used to represent information about said I/O device; and at least one finder/filter object, said finder/filter object being used to find said information object.

4. The computer system of claim 2 wherein said device controller is further comprised of at least one hardware object, said hardware object being used to represent said I/O device.

5. The computer system of claim 4 wherein said device controller is further comprised of at least one service object, said service object being used to perform service on said I/O device.

6. The computer system of claim 4 wherein said device controller is further comprised of at least one statistics object, said statistics object being used to collect statistical information about said I/O device.

7. A I/O device controller mechanism, said I/O device controller mechanism comprising:

an I/O framework mechanism, said I/O framework mechanism being used to manage and control at least one I/O device, said I/O framework mechanism comprising core function and extensible function, said core function being designed such that said core function is not to be subject to modification by a consumer of said framework mechanism, said extensible function being designed such that said extensible function can be customized and extended by said consumer.

8. The I/O device controller mechanism of claim 7 wherein said core function comprises a hardware resource administrator and first portions of a device controller and first portions of an information controller and wherein said extensible function comprises second portions of said device controller and second portions of said information controller.

9. The I/O device controller mechanism of claim 8 wherein said resource administrator is further comprised of:

at least one container object, said container object being used to contain at least one information object, said information object being used to represent information about said I/O device; and at least one finder/filter object, said finder/filter object being used to find said information object.

10. The I/O device controller mechanism of claim 8 wherein said device controller is further comprised of at least one hardware object, said hardware object being used to represent said I/O device.

11. The I/O device controller mechanism of claim 10 wherein said device controller is further comprised of at least one service object, said service object being used to perform service on said I/O device.

12. The I/O device controller mechanism of claim 10 wherein said device controller is further comprised of at least one statistics object, said statistics object being used to collect statistical information about said I/O device.

13. A program product, said program product comprising:
a recordable media; and
an I/O framework mechanism recorded on said recordable media, said I/O framework mechanism being used to manage and control at least one I/O device, said I/O framework mechanism comprising core function and extensible function, said core function being designed such that said core function is not to be subject to modification by a consumer of said framework mechanism, said extensible function being designed such that said extensible function can be customized and extended by said consumer.

14. The program product of claim 13 wherein said core function comprises a hardware resource administrator and first portions of a device controller and first portions of an information controller and wherein said extensible function comprises second portions of said device controller and second portions of said information controller.

15. The program product of claim 14 wherein said resource administrator is further comprised of:

at least one container object, said container object being used to contain at least one information object, said information object being used to represent information about said I/O device; and at least one finder/filter object, said finder/filter object being used to find said information object.

16. The program product of claim 14 wherein said device controller is further comprised of at least one hardware object, said hardware object being used to represent said I/O device.

17. The program product of claim 16 wherein said device controller is further comprised of at least one service object, said service object being used to perform service on said I/O device.

18. The program product of claim 16 wherein said device controller is further comprised of at least one statistics object, said statistics object being used to collect statistical information about said I/O device.

19. A method for distributing a program product, said method comprising the steps of:

initiating a connection between a first computer system and a second computer system;

transmitting a program product from said first computer system to said second computer system, said program product being an I/O framework mechanism, said I/O framework mechanism being used to manage and control at least one I/O device, said I/O framework mechanism comprising core function and extensible function, said core function being designed such that said core function is not to be subject to modification by a consumer of said framework mechanism, said extensible function being designed such that said extensible function can be customized and extended by said consumer.

20. The method of claim 19 wherein said core function comprises a hardware resource administrator and first portions of a device controller and first portions of an information controller and wherein said extensible function comprises second portions of said device controller and second portions of said information controller.

21. The method of claim 20 wherein said resource administrator is further comprised of:

at least one container object, said container object being used to contain at least one information object, said information object being used to represent information about said I/O device; and at least one finder/filter object, said finder/filter object being used to find said information object.

22. The method of claim 20 wherein said device controller is further comprised of at least one hardware object, said hardware object being used to represent said I/O device.

23. The method of claim 22 wherein said device controller is further comprised of at least one service object, said service object being used to perform service on said I/O device.

24. The method of claim 22 wherein said device controller is further comprised of at least one statistics object, said statistics object being used to collect statistical information about said I/O device.

25. A method for operating an I/O device, said method comprising the steps of:

requesting that data be sent to said I/O device for handling; and receiving said request, said request being received by an I/O framework mechanism, said I/O framework mechanism being used to manage and control said I/O device, said I/O framework mechanism comprising core function and extensible function, said core function being designed such that said core function is not to be subject to modification by a consumer of said framework mechanism, said extensible function being designed such that said extensible function can be customized and extended by said consumer.

26. The method of claim 25 wherein said core function comprises a hardware resource administrator and first portions of a device controller and first portions of an information controller and wherein said extensible function comprises second portions of said device controller and second portions of said information controller.

27. The method of claim 26 wherein said resource administrator is further comprised of:

at least one container object, said container object being used to contain at least one information object, said information object being used to represent information about said I/O device; and at least one finder/filter object, said finder/filter object being used to find said information object.

28. The method of claim 26 wherein said device controller is further comprised of at least one hardware object, said hardware object being used to represent said I/O device.

29. The method of claim 28 wherein said device controller is further comprised of at least one service object, said service object being used to perform service on said I/O device.

30. The method of claim 28 wherein said device controller is further comprised of at least one statistics object, said statistics object being used to collect statistical information about said I/O device.

* * * * *